US009687791B2

(12) United States Patent
Nair et al.

(10) Patent No.: US 9,687,791 B2
(45) Date of Patent: Jun. 27, 2017

(54) FLOW PROCESSING AND CHARACTERIZATION OF METAL-ORGANIC FRAMEWORK (MOF) MEMBRANES IN HOLLOW FIBER AND TUBULAR MODULES

(71) Applicant: Georgia Tech Research Corporation, Atlanta, GA (US)

(72) Inventors: Sankar Nair, Atlanta, GA (US); Andrew J. Brown, Atlanta, GA (US); Nicholas A. Brunelli, Atlanta, GA (US); Christopher W. Jones, Atlanta, GA (US)

(73) Assignee: GEORGIA TECH RESEARCH CORPORATION, Atlanta, GA (US)

( * ) Notice: Subject to any disclaimer, the term of this patent is extended or adjusted under 35 U.S.C. 154(b) by 437 days.

(21) Appl. No.: 14/231,871

(22) Filed: Apr. 1, 2014

(65) Prior Publication Data
US 2014/0336435 A1     Nov. 13, 2014

Related U.S. Application Data

(60) Provisional application No. 61/913,592, filed on Dec. 9, 2013, provisional application No. 61/820,489, filed on May 7, 203.

(51) Int. Cl.
    *B01D 63/06*     (2006.01)
    *B01D 69/08*     (2006.01)
    *B01D 67/00*     (2006.01)

(52) U.S. Cl.
    CPC ....... *B01D 63/063* (2013.01); *B01D 67/0051* (2013.01); *B01D 69/08* (2013.01); *Y10T 29/49345* (2015.01)

(58) Field of Classification Search
    CPC .............. B01J 19/2475; B01D 63/063; B01D 67/0051; B01D 53/228; B01D 2053/224; Y10T 29/49345; C07C 7/144
    See application file for complete search history.

(56) References Cited

U.S. PATENT DOCUMENTS

| 5,968,366 A | 10/1999 | Deckman et al. |
| 6,953,493 B2 | 10/2005 | Nakayama et al. |

(Continued)

FOREIGN PATENT DOCUMENTS

| CN | 1617761 A | 5/2005 |
| CN | 1914219 A | 2/2007 |

(Continued)

OTHER PUBLICATIONS

CN Mar. 9, 2015 Response to Office Action (with English translation of claims) filed in China Patent Application No. 201180052181.7.

(Continued)

*Primary Examiner* — Lessanework Seifu
(74) *Attorney, Agent, or Firm* — Adams and Reese LLP

(57) ABSTRACT

A reactor cell for measuring gas and liquid permeation is disclosed. The reactor cell comprises a reactor module having a reactor chamber and a cover. A first hole extends into the reactor chamber from a first surface, a second hole opposing the first hole extends into the reactor chamber from a second surface, a third hole extends into the reactor chamber from a third surface and a fourth hole opposing the third hole extends into the reactor chamber from a fourth surface. A hollow fiber is supported by and sealed into the first and second holes of the reactor module. The first and second ends of the hollow fiber are sealed with a sealing solution. Methods for making and using the reactor cell are also disclosed. As made and used, the reactor cell further (Continued)

comprises a molecular sieving membrane grown on an inner bore surface of the hollow fiber.

28 Claims, 32 Drawing Sheets
(23 of 32 Drawing Sheet(s) Filed in Color)

(56) References Cited

U.S. PATENT DOCUMENTS

| | | |
|---|---|---|
| 7,014,680 B2 | 3/2006 | Nakayama et al. |
| 7,306,647 B2 | 12/2007 | Miller et al. |
| 7,494,610 B2 | 2/2009 | Yeung et al. |
| 7,553,352 B2 | 6/2009 | Mueller et al. |
| 7,880,026 B2 | 2/2011 | Ni et al. |
| 7,973,090 B2 | 7/2011 | Suzuki et al. |
| 8,042,695 B2 | 10/2011 | Ishibashi |
| 8,123,834 B2 | 2/2012 | Masel et al. |
| 8,132,678 B2 | 3/2012 | Liu et al. |
| 8,269,029 B2 | 9/2012 | Masel et al. |
| 8,302,782 B2 | 11/2012 | Falconer et al. |
| 8,518,153 B2 | 8/2013 | Ryan et al. |
| 8,673,057 B2 | 3/2014 | Zhou et al. |
| 8,725,482 B2 | 5/2014 | Haldoupis et al. |
| 2002/0003105 A1 | 1/2002 | McEvoy |
| 2002/0031303 A1 | 3/2002 | Wang |
| 2004/0058224 A1 | 3/2004 | Eshraghi et al. |
| 2004/0139908 A1 | 7/2004 | Bowe et al. |
| 2004/0173094 A1 | 9/2004 | Nakayama et al. |
| 2005/0124819 A1 | 6/2005 | Yaghi et al. |
| 2005/0204916 A1 | 9/2005 | Falconer et al. |
| 2005/0229779 A1 | 10/2005 | Nakayama et al. |
| 2005/0233945 A1 | 10/2005 | Brown et al. |
| 2006/0107830 A1 | 5/2006 | Miller et al. |
| 2006/0201884 A1 | 9/2006 | Kulprathipanja et al. |
| 2007/0022877 A1 | 2/2007 | Marand et al. |
| 2007/0112189 A1 | 5/2007 | Ikeda et al. |
| 2007/0244347 A1 | 10/2007 | Ying et al. |
| 2008/0047432 A1 | 2/2008 | Nonaka et al. |
| 2008/0177098 A1 | 7/2008 | Bahnmuller et al. |
| 2008/0214686 A1 | 9/2008 | Suzuki et al. |
| 2008/0261101 A1 | 10/2008 | de Figueiredo Gomes et al. |
| 2008/0287413 A1 | 11/2008 | Aslund et al. |
| 2009/0004084 A1 | 1/2009 | Bell et al. |
| 2009/0011926 A1 | 1/2009 | Yajima et al. |
| 2009/0060839 A1 | 3/2009 | Boyes et al. |
| 2009/0111959 A1 | 4/2009 | Cao et al. |
| 2009/0114089 A1 | 5/2009 | Liu et al. |
| 2009/0126570 A1 | 5/2009 | Liu et al. |
| 2009/0131643 A1 | 5/2009 | Ni et al. |
| 2009/0152755 A1 | 6/2009 | Liu et al. |
| 2009/0155464 A1 | 6/2009 | Liu et al. |
| 2009/0211440 A1 | 8/2009 | Reyes et al. |
| 2010/0006503 A1 | 1/2010 | Bratton et al. |
| 2010/0071559 A1 | 3/2010 | Miachon et al. |
| 2010/0072424 A1 | 3/2010 | Petoud et al. |
| 2010/0132549 A1 | 6/2010 | Yaghi et al. |
| 2010/0144512 A1 | 6/2010 | Uchikawa et al. |
| 2010/0226991 A1 | 9/2010 | Horcajada-Cortes et al. |
| 2011/0158923 A1 | 6/2011 | Galeone et al. |
| 2011/0160039 A1 | 6/2011 | Himeno et al. |
| 2011/0298115 A1 | 12/2011 | Celaya et al. |
| 2011/0319630 A1 | 12/2011 | Yaghi et al. |
| 2012/0003475 A1 | 1/2012 | Benin et al. |
| 2012/0058302 A1 | 3/2012 | Eggenspieler et al. |
| 2012/0070904 A1 | 3/2012 | Stoddart et al. |
| 2012/0202006 A1 | 8/2012 | Rimer |
| 2012/0310018 A1 | 12/2012 | Lai et al. |
| 2013/0064747 A1 | 3/2013 | Zhou et al. |
| 2013/0157837 A1 | 6/2013 | Banerjee et al. |
| 2013/0197235 A1 | 8/2013 | Thompson et al. |

FOREIGN PATENT DOCUMENTS

| | | |
|---|---|---|
| CN | 103201016 B | 9/2015 |
| WO | WO-2005099885 A1 | 10/2005 |
| WO | WO-2007139766 A2 | 12/2007 |
| WO | WO-2010103856 | 9/2010 |
| WO | WO-2012074487 A1 | 6/2012 |
| WO | WO-2013020968 A2 | 2/2013 |

OTHER PUBLICATIONS

JP Apr. 7, 2015 Office Action mailed in Japan Patent Application No. 2013-536619 (with English translation).
JP Apr. 24, 2015 English translation of Description and Claims for JP Patent Application Laid-Open No. 2002-338229.
JP Apr. 24, 2015 English translation of Description and Claims for JP Patent Application Laid-Open No. 2008-173576.
CN Dec. 12, 2014 Response to Office Action filed in China Patent Application No. 201080057358.8 (with English translation).
CN Mar. 16, 2015 Third Office Action mailed in China Patent Application No. 201080057358.8 (with English translation).
PCT Jul. 27, 2012 International Search Report and Written Opinion issued in International Patent Application No. PCT/US2012/025064.
PCT May 25, 2012 International Search Report and Written Opinion issued in International Patent Application No. PCT/US2012/025080.
Sep. 1, 2015 Office Action mailed in U.S. Appl. No. 13/897,939, filed May 20, 2013.
Dec. 1, 2015 Amendment and Response to Office Action Mailed on Sep. 1, 2015 in U.S. Appl. No. 13/897,939, filed May 20, 2013
Ameloot, et al., *Interfacial synthesis of hollow metal-organic framework capsules demonstrating selective permeability*, Nature Chemistry 3 (May 2011) 382-387.
Brown, et al., *Continuous polycrystalline zeolitic imidazolate framework-90 membranes on polymeric hollow fibers*, Angew. Chem. 124 (2012) 10767-10770.
Buonomenna, *Membrane processes for a sustainable industrial growth*, RSC Adv. 3 (2013) 5694-5740.
Bux, et al., *Oriented zeolitic imidazolate framework-8 membrane with sharp $H_2/C_3H_8$ molecular sieve separation*, Chem. Mater. 23 (2011) 2262-2269.
Cao, et al., *Growth of uniformly oriented silica MFI and BEA zeolite films on substrates*, Science 334 (Dec. 16, 2001) 1533-1538.
Choi, et al., *Grain boundary defect elimination in a zeolite membrane by rapid thermal processing*, Science 325 (Jul. 31, 2009) 590-593.
Gascon, et al., *Accelerated synthesis of all-silica DD3R and its performance in the separation of propylene/propane mixtures*, Microporous & Mesoporous Materials 115 (2008) 585-593.
Gascon, et al., *Practical approach to zeolitic membranes and coatings: State of the art, opportunities, barriers, and future perspectives*, Chem. Mater. 24 (2012) 2829-2844.
Huang, et al., *Steam-stable zeolitic imidazolate framework ZIF-90 membrane with hydrogen selectivity through covalent functionalization*, J. Am. Chem. Soc. 132(44) (2010) 15562-15564.
Jang, et al., *Modified mesoporous silica gas separation membranes on polymeric hollow fibers*, Chem. Mater. 23 (2011) 3025-3028.
Kwon, et al., *Highly propylene-selective supported zeolite-imidazolate framework (ZIF-8) membranes synthesized by rapid microwave-assisted seeding and secondary growth*, Chem. Commun. 49 (2013) 3854-3856.
Li, et al., *Zeolitic imidazolate frameworks for kinetic separation of propane and propene*, J. Am. Chem. Soc. 131(30) (2009) 10368-10369.
Pan, et al., *Effective separation of propylene/propane binary mixtures by ZIF-8 membranes*, J. Membrane Science 390-391 (2012) 93-98.
Pan, et al., *Sharp separation of C2/C3 hydrocarbon mixtures by zeolitic imidazolate framework-8 (ZIF-8) membranes synthesized in aqueous solutions*, Chem. Commun. 47(37) (Oct. 7, 2011) 10275-10277.
Pan, et al., *Synthesis of ceramic hollow fiber supported zeolitic imidazolate framework-8 (ZIF-8) membranes with high hydrogen permeability*, J. Membrane Science 421-422 (2012) 292-298.

(56) References Cited

OTHER PUBLICATIONS

Park, et al., *Exceptional chemical and thermal stability of zeolitic imidazolate frameworks*, PNAS 103(27) (Jul. 5, 2006) 10186-10191.

Pera-Titus, et al., *Preparation of inner-side tubular zeolite NaA membranes in a semi-continuous synthesis system*, J. Membrane Science 278 (2006) 401-409.

Shah, et al., *Current status of metal-organic framework membranes for gas separations: Promises and challenges*, Ind. Eng. Chem. Res. 51 (2012) 2179-2199.

Thompson, et al., *Hybrid zeolitic imidazolate frameworks: Controlling framework porosity and functionality by mixed-linker synthesis*, Chem. Mater. 24 (2012) 1930-1936.

Tsapatsis, *Toward high-throughput zeolite membranes*, Science 334 (Nov. 11, 2011) 767-768.

Varoon, et al., *Dispersible exfoliated zeolite nanosheets and their application as a selective membrane*, Science 334 (Oct. 7, 2011) 72-75.

PCT Aug. 22, 2014 International Search Report and Written Opinion issued in International Application PCT/US14/133169.

Aug. 3, 2012 Office Action/Non-Final Rejection mailed in U.S. Appl. No. 12/971,132, filed Dec. 17, 2010.

Dec. 18, 2012 Response to Office Action mailed Aug. 3, 2012 filed in U.S. Appl. No. 12/971,132, filed Dec. 17, 2010.

Jan. 28, 2013 Office Action/Final Rejection mailed in U.S. Appl. No. 12/971,132, filed Dec. 17, 2010.

Jun. 24, 2013 Response to Final Office Action mailed Jan. 28, 2013 with Declaration filed in U.S. Appl. No. 12/971,132, filed Dec. 17, 2010.

Aug. 14, 2013 Office Action/Non Final Rejection mailed in U.S. Appl. No. 12/971,132, filed Dec. 17, 2010.

Feb. 11, 2014 Response to Office Action mailed Aug. 14, 2013 with Declaration filed in U.S. Appl. No. 12/971,132, filed Dec. 17, 2010.

Mar. 3, 2014 Notice of Allowance/Allowability with Examiner's Amendment and Statement of Reasons for Allowance mailed in U.S. Appl. No. 12/971,132, filed Dec. 17, 2010.

Oct. 31, 2013 Office Action/Non-Final Rejection mailed in U.S. Appl. No. 12/971,132, filed Dec. 17, 2010.

Jan. 17, 2014 Response to Office Action mailed Oct. 31, 2013 filed in U.S. Appl. No. 13/396,411, filed Feb. 14, 2012.

Apr. 9, 2014 Final Office Action mailed in U.S. Appl. No. 13/396,411, filed Feb. 14, 2012.

Jun. 3, 2014 Response to Final Office Action filed in U.S. Appl. No. 13/396,411, filed Feb. 14, 2012.

Jun. 11, 2014 Notice of Allowance/Allowability with Examiner's Amendment/Comment mailed in U.S. Appl. No. 13/396,411, filed Feb. 14, 2012.

Dec. 19, 2013 Notice of Allowance/Allowability with Examiner's Amendment/Comment mailed in U.S. Appl. No. 13/399,645, filed Feb. 17, 2012.

Apr. 19, 2013 Office Action Non-Final mailed in U.S. Appl. No. 13/209,957, filed Aug. 12, 2011.

Jun. 14, 2013 Response to Office Action Mailed Apr. 19, 2013 in U.S. Appl. No. 13/209,957, filed Aug. 15, 2011.

Jul. 11, 2013 Notice of Allowance / Allowability mailed in U.S. Appl. No. 13/209,957, filed Aug. 15, 2011.

Gordillo, et al., *Site percolation in zeolitic frameworks*, Zeolites 15 (1995) 656-659.

Moloy, et al., *High-silica zeolites: A relationship between energetics and internal surface areas*, Microporous & Mesoporous Materials 54 (2002) 1-13.

Nair, *Nanoscopic metal oxide objects via controlled creation and rearrangement of amorphous nanoparticles*, presented Dec. 11, 2007, School of Chemical & Biomolecular Engineering Georgia Institute of Technology, Atlanta, GA 30332-0100.

Skoulidas, et al., *Self-diffusion and transport diffusion of light gases in metal-organic framework materials assessed using molecular dynamics simulations*, J. Phys. Chem. B 109 (2005) 15760-15768.

Chen, et al., *Interwoven metal-organic framework on a periodic minimal surface with extra-large pores*, Science 291 (2001) 1021-1023.

Eddaoudi, et al., *Design and synthesis of metal-carboxylate frameworks with permanent microporosity*, Topics in Catalysis 9 (1999) 105-111.

Foster, et al., *A geometric solution to the largest free-sphere problem in zeolite frameworks*, Microporous & Mesoporous Materials 90(1-3) (2006) 32-38.

Hoshen, et al., *Percolation and cluster distribution. I. Cluster multiple labeling technique and critical concentration algorithm*, Physical Review B 14(8) (1976) 3438.

Keskin, et al., *Efficient methods for screening of metal organic framework membranes/or gas separations using atomically detailed models*, Langmuir 25(19) (2009) 11786-11795.

Li, et al., *Design and synthesis of an exceptionally stable and highly porous metal-organic framework*, Nature 402 (1999) 276-279.

Ockwig, et al., *Reticular chemistry: Occurrence and taxonomy nets and grammar for the design of frameworks*, Acc. Chem. Res. 38(3) (2005) 176-182.

Seki, *Dynamic channels of a porous coordination polymer responding to external stimuli*, Phys. Chem. Chem. Phys. 4(10) (2002) 1968-1971.

Yaghi, et al., *Reticular synthesis and the design of new materials*, Nature 423 (2003) 705-714.

PCT Feb. 24, 2011 International Search Report and Written Opinion mailed in International Patent Application PCT/US2010/060945.

CN Mar. 14, 2014 Notification of the First Office Action mailed in Chinese Patent Application 201080057358.8 (with English Translation).

CN Jul. 28, 2014 Response to First Office Action mailed on Mar. 14, 2014 filed in Chinese Patent Application 201080057358.8 (with English Translation).

CN Sep. 28, 2014 Notification of the Second Office Action mailed in Chinese Patent Application 201080057358.8 (with English Translation).

JP Nov. 26, 2011 Office Action mailed in Japanese Patent Application 2012-543346 (with English Translation).

JP Jul. 17, 2014 Examiners Decision of Refusal mailed in Japanese Patent Application 2012-543346 (with English Translation).

KR Feb. 10, 2014 Notice of Submission of Opinion/Office Action mailed in Korean Patent Application 10-2012-7013862 (with English Translation).

Den Exter, M.J., et al., *Separation of permanent gases on the all-silica 8-ring clathrasil DD3R*, (Weitkamp, J., et al., eds. *Zeolites and Related Microporous Materials: State of the Art 1994*), Studies in Surface Science and Catalysis 84 (1994) 1159-66.

Gies, H., *Studies on clathrasils. IX crystal structure of deca-dodecasil 3R, the missing link between zeolites and clathrasils*, Zeitschrift für Kristallographie 175 (1986) 93-104.

Himeno, Shuji, et al., *Characterization and selectivity for methane and carbon dioxide adsorption on the all-silica DD3R zeolite*, Micropor. Mesopor. Mater. 98 (2007) 62-69.

Tomita, Toshihiro, et al., *Gas separation characteristics of DDR type zeolite membrane*, Micropor. Mesopor. Mater. 68 (2004) 71-75.

Yang, Qi-Liang, et al., *Synthesis of DDR-type zeolite in fluoride medium*, Chinese Journal of Inorganic Chemistry 25(2) (2009) 191-194.

Aguado, Sonia, et al., *Facile synthesis of an ultramicroporous MOF tubular membrane with selectivity towards CO2*, New J. Chem. 35 (2011) 41-44.

Bae, Tae-Hyun, et al., *A high-performance gas-separation membrane containing submicrometersized metal-organic framework crystals*, Angew. Chem. Int. Edit. 49 (2010) 9863-66.

Baker, Richard W., *Future directions of membrane gas separation technology*, Ind. Eng. Chem. Res. 41(6) (2002) 1393-411.

Baker, Richard W. And Kaaeid Lokhandwala, *Natural gas processing with membranes: An overview*, Ind. Eng. Chem. Res. 47(7) (2008) 2109-21.

Brar, Tejinder, et al., *Control of crystal size and distribution of zeolite A*, Ind. Eng. Chem. Res. 40 (2001) 1133-39.

(56) References Cited

OTHER PUBLICATIONS

Bux, Helge, et al., *Zeolitic imidazolate framework membrane with molecular sieving properties by microwave-assisted solvothermal synthesis*, J. Am. Chem. Soc. 131(44) (2009) 16000-01.

Caro, Jüergen and Manfred Noack, *Zeolite membranes—Recent developments and progress*, Micropor. Mesopor. Mater. 115 (2008) 215-33.

Carreon, Moises A., et al., *Alumina-supported SAPO-34 membranes for $CO_2/CH_4$ separation*, J. Am. Chem. Soc. 130(16) (2008) 5412-13.

Centrone, Andrea, et al., *Growth of metal-organic frameworks on polymer surfaces*, J. Am. Chem. Soc. 132(44) (2010) 15687-91.

Chen, Banglin, et al., *A microporous metal-organic framework for gas-chromatographic separation of alkanes*, Agnew. Chem. Int. Ed. 45 (2006) 1390-93.

Chiu, W. V., et al., *Post-synthesis defect abatement of inorganic membranes for gas separation*, J. Membr. Sci. 377 (2011) 182-90.

Cui, Ying, et al., *Preparation and gas separation performance of zeolite T membrane*, J. Mater. Chem. 14(5) (2004) 924-32.

Cui, Ying, et al., *Preparation and gas separation properties of zeolite T membrane*, Chem. Comm. 17 (2003) 2154-55.

Favre, Eric, *Carbon dioxide recovery from post-combustion processes: Can gas permeation membranes compete with absorption?*, J. Membr. Sci. 294 (2007) 50-59.

Forster, Paul M., et al., *A high-throughput investigation of the role of pH, temperature, concentration, and time on the synthesis of hybrid inorganic-organic materials*, Angew. Chem. Int. Ed. 44 (2005) 7608-11.

Ge, Qingqin, et al., *High-performance zeolite NaA membranes on polymer-zeolite composite hollow fiber supports*, J. Am. Chem. Soc. 131(47) (2009) 17056-57.

Hao, Ji Hua and Shichang Wang, *Influence of quench medium on the structure and gas permeation properties of cellulose acetate membranes*, J. Appl. Polym. Sci. 68(8) (1998) 1269-76.

Heng, Samuel, et al., *Low-temperature ozone treatment for organic template removal from zeolite membrane*, J. Membr. Sci. 243 (2004) 69-78.

Himeno, Shuji, et al., *Synthesis and permeation properties of a DDR-type zeolite membrane for separation of $CO_2/CH_4$ gaseous mixtures*, Ind. Eng. Chem. Res. 46(21) (2007) 6989-97.

Huang, Aisheng, & Jürgen Caro, *Covalent post-functionalization of zeolitic imidazolate framework ZIF-90 membrane for enhanced hydrogen selectivity*, Angew. Chem. Int. Ed. 50 (2011) 4979-82.

Huang, Aisheng, et al., *Molecular-sieve membrane with hydrogen permselectivity: ZIF-22 in LTA topology prepared with 3-aminopropyltriethoxysilane as covalent linker*, Angew. Chem. Int. Ed. 49 (2010) 4958-61.

Huang, Aisheng and Jürgen Caro, *Cationic polymer used to capture zeolite precursor particles for the facile synthesis of oriented zeolite LTA molecular sieve membrane*, Chem. Mater. 22(15) (2010) 4353-55.

Husain, Shabbir, Mixed Matrix Dual Layer Hollow Fiber Membranes for Natural Gas Separation, Dissertation, Georgia Institute of Technology, Atlanta, GA, 2006, 48-49.

Jee, Sang Eun and David S. Sholl, *Carbon dioxide and methane transport in DDR zeolite: Insights from molecular simulations into carbon dioxide separations in small pore zeolites*, J. Am. Chem. Soc. 131(22) (2009) 7896-7904.

Jie, Xingming, et al., *Gas permeation performance of cellulose hollow fiber membranes made from the cellulose/N-methylmorpholine-N-oxide/$H_2O$ system*, J. Appl. Polym. Sci. 91(3) (2004) 1873-80.

Kanezashi, Masakoto, et al., *Gas permeation through DDR-type zeolite membranes at high temperatures*, AIChE J. 54(6) (2008) 1478-86.

Koros, William J. And Rajiv Mahajan, *Pushing the limits on possibilities for large scale gas separation: Which strategies?*, J. Membr. Sci. 175 (2000) 181-96.

Kuhn, Jelan, et al., *Detemplation of DDR type zeolites by ozonication*, Micropor. Mesopor. Mater. 120 (2009) 12-18.

Ku Mar, P. et al., *Ordered mesoporous membranes: Effects of support and surfactant removal conditions on membrane quality*, J. Membr. Sci. 279 (2006) 539-47.

Kusakabe, Katsuki, et al., *Formation of a Y-type zeolite membrane on a porous alpha-alumina tube for gas separation*, Ind. Eng. Chem. Res. 36(3) (1997) 649-55.

Lee, Clare, et al., *Thermodynamic and kinetic factors in the hydrothermal synthesis of hybrid frameworks: Zinc 4-cyclohexene-1,2-dicarboylates*, Chem. Comm. (2006) 2687-89.

Li, Shiguang, et al., *Scale-up of SAPO-34 membranes for $CO_2/CH_4$ separation*, J. Membr. Sci. 352 (2010) 7-13.

Li, Yan-Shuo, et al., *Molecular sieve membrane: Supported metal-organic framework with high hydrogen selectivity*, Angew. Chem. Int. Edit. 49 (2010) 548-51.

Li, Zong-Qun, et al., *Fabrication of nanosheets of a fluorescent metal-organic framework $[Zn(BDC)(H_2O)]_n$ (BDC =1,4-benzenedicarboxylate): Ultrasonic synthesis and sensing of ethylamine*, Inorganic Chemistry Communications 11(11) (2008) 1375-77.

Li, Zong-Qun, et al., *Ultrasonic synthesis of the microporous metal-organic framework $Cu_3(BTC)_2$ at ambient temperature and pressure: An efficient and environmentally friendly method*, Mater. Lett. 63 (2009) 78-80.

Lin, Zhoujia, et al., *Chiral induction in the ionothermal synthesis of a 3-D coordination polymer*, J. Am. Chem. Soc. 129(16) (2007) 4880-81.

Lindmark, Jonas and Jonas Hedlund, *Modification of MFI membranes with amine groups for enhanced $CO_2$ selectivity*, J. Mater. Chem. 20(11) (2010) 2219-25.

Liu, Xin-Lei, et al., *An organophilic pervaporation membrane derived from metal-organic framework nanoparticles for efficient recovery of bio-alcohols*, Angew. Chem. Int. Ed. 50(45) (2011) 10636-39.

Liu, Yunyang, et al., *Synthesis and characterization of ZIF-69 membranes and separation for $CO_2/CO$ mixture*, J. Membr. Sci. 353 (2010) 36-40.

Liu, Yunyang, et al., *Synthesis of highly c-oriented ZIF-69 membranes by secondary growth and their gas permeation properties*, J. Membr. Sci. 379 (2011) 46-51.

Ma, Bao-Qing, et al., *Microporous pillared paddle-wheel frameworks based on mixed-ligand coordination of zinc Ions*, Inorg. Chem. 44(14) (2005) 4912-14.

Matsuda, H., et al., *Improvement of ethanol selectivity of silicalite membrane in pervaporation by silicone rubber coating*, J. Membr. Sci. 210(2) (2002) 433-37.

McCarthy, Michael C., et al., *Synthesis of zeolitic imidazolate framework films and membranes with controlled microstructures*, Langmuir 26(18) (2010) 14636-41.

Morris, William, et al., *Crystals as molecules: Postsynthesis covalent functionalization of zeolitic imidazolate frameworks*, J. Am. Chem. Soc. 130(38) (2008) 12626-27.

Nair, Sankar, et al., *Separation of close boiling hydrocarbon mixtures by MFI and FAU membranes made by secondary growth*, Micropor. Mesopor. Mater. 48 (2001) 219-28.

Pachfule, Pradip, et al., *Solvothermal synthesis, structure, and properties of metal organic framework isomers derived from a partially fluorinated link*, Cryst. Growth Des. 11 (2011) 1215-22.

Pan, Long, et al., *Microporous metal organic materials: Promising candidates as sorbents for hydrogen storage*, J. Am. Chem. Soc. 126(5) (2004) 1308-09.

Parikh, Atul N., et al., *Non-thermal calcination by ultraviolet irradiation in the synthesis of microporous materials*, Micropor. Mesopor. Mater. 76 (2004) 17-22.

Qiu, Wulin, et al., *Dehydration of ethanol-water mixtures using asymmetric hollow fiber membranes from commercial polyimides*, J. Membr. Sci. 327 (2009) 96-103.

Ranjan, Rajiv and Michael Tsapatsis, *Microporous metal organic framework membrane on porous support using the seeded growth method*, Chem. Mater. xxx(xx) (2009) 000-000.

Sommer, Stefan and Thomas Melin, *Influence of operation parameters on the separation of mixtures by pervaporation and vapor permeation with inorganic membranes. Part 1: Dehydration of solvents*, Chem. Eng. Sci. 60 (2005) 4509-23.

(56) References Cited

OTHER PUBLICATIONS

Son, Won-Jin, et al., *Sonochemical synthseis of MOF-5*, Chem. Commun. 47 (2008) 6336-38.
Van Den Bergh, J., et al., *Separation and permeation characteristics of a DD3R zeolite membrane*, J. Membr. Sci. 316 (2008) 35-45.
Van Den Bergh, Johan, et al., *Modeling permeation of $CO_2/CH_4$, $N_2/CH_4$, and $CO_2$/air mixtures across a DD3R zeolite membrane*, J. Phys. Chem. C 114(20) (2010) 9379-89.
Venna, Surendar R. And Moises A. Carreon, *Highly permeable zeolite imidazolate framework-8 membranes for CO2/CH4 separation*, J. Am. Chem. Soc.132(1) (2010) 76-78.
Watanabe, Taku, et al., *Computational identification of a metal organic framework for high selectivity membrane-based $CO_2/CH_4$ separations:* $Cu(hfipbb)(H_2hfipbb)_{0.5}$, Phys. Chem. Chem. Phys. 11 (2009) 11389-94.
Xomeritakis, George, et al., *Transport properties of alumina-supported MFI membranes made by secondary (seeded) growth*, Micropor. Mesopor. Mater. 38 (2000) 61-73.
Weh, K., et al., *Permeation of single gases and gas mixtures through faujasite-type molecular sieve membrances*, Micropor. Mesopor. Mater. 54 (2002) 27-36.
Xu, Gengsheng, et al., *Preparation of ZIF-8 membranes supported on ceramic hollow fibers from a concentrated synthesis gel*, J. Membr. Sci. 385-386 (2011) 187-93.
Yao, Jianfeng, et al., *Contra-diffusion synthesis of ZIF-8 films on a polymer substrate*, Chem. Commun. 47 (2011) 2559-61.
Yan, Yushan, et al., *Preparation of highly selective zeolite ZSM-5 membranes by a post-synthetic coking treatment*, J. Membr. Sci. 123(1) (1997) 95-103.
Yang, Lisha and Huimin Lu, *Microwave-assisted ionothermal synthesis and characterization of zeolitic imidazolate framework-8*, Chinese J. Chem. 30 (2012) 1040-44.
Yoo, Won Cheol, et al., *High-performance randomly oriented zeolite membranes using brittle seeds and rapid thermal processing*, Angew. Chem. Int. Ed. 49 (2010) 8699-703.
Zhang, Yanfeng, et al., *Blocking defects in SAPO-34 membranes with cyclodextrin*, J. Membr. Sci. 358 (2010) 7-12.
Zheng, Zhenkun, et al., *Synthesis, characterization and modification of DDR membranes grown on alpha-alumina supports*, J. Mater. Sci. 43 (2008) 2499-502.
PCT Jul. 27, 2012 International Search Report and Written Opinion issued in International Patent Application PCT/US2012/025064.
PCT May 25, 2012 International Search Report and Written Opinion issued in International Patent Application PCT/US2012/025080.
PCT Nov. 6, 2012 International Search Report and Written Opinion issued in International Patent Application PCT/US2012/054817.
PCT Feb. 23, 2012 International Search Report and Written Opinion issued in International Patent Application PCT/US2011/047769.
PCT Oct. 18, 2013 International Search Report and Written Opinion issued in International Patent Application PCT/US2013/042075.
Mar. 5, 2013 Office Action mailed for U.S. Appl. No. 13/611,988, filed Sep. 12, 2012.
Jun. 5, 2013 Response to Office Action mailed Mar. 5, 2013 for U.S. Appl. No. 13/611,988, filed Sep. 12, 2012.
Jun. 10, 2013 Office Action/Noncompliant Amendment mailed for U.S. Appl. No. 13/611,988, filed Sep. 12, 2012.
Jun. 14, 2013 Response to Office Action/Noncompliant Amendment mailed Jun. 10, 2013 for U.S. Appl. No. 13/611,988, filed Sep. 12, 2012.
Sep. 5, 2013 Office Action mailed for U.S. Appl. No. 13/611,988, filed Sep. 12, 2012.
Nov. 5, 2013 Response to Final Office Action mailed Sep. 5, 2013 for U.S. Appl. No. 13/611,988, filed Sep. 12, 2012.
Nov. 18, 2013 Notice of Allowability mailed for U.S. Appl. No. 13/611,988, filed Apr. 4, 2011.
Nov. 20, 2013 Notice of Allowability mailed for U.S. Appl. No. 13/399,645, filed Feb. 17, 2012.
Marler, et al., *Studies on clathrasils VIII. Nonasils-$[4^1 5^8]$, $88SiO_2*8M^8*8M^9*4M^{20}$: Synthesis, thermal properties, and crystal structure*, J. Inclusion Phenomena 4(4) (1986) 339-349.
Aksay, et al., *Biometric pathways for assembling inorganic thin films*, Science 273(5277) (1996) 892-898.
Miyata, et al., *Silica films with a single-crystalline mesoporous structure*, Nat. Mater. 3(9) (2004) 651-656.
Yang, et al., *Registered growth of mesoporous silica films on graphite*, J. Mater. Chem. 7(7) (1997) 1285-1290.

FLOW PROCESSING AND CHARACTERIZATION OF METAL-ORGANIC FRAMEWORK (MOF) MEMBRANES IN HOLLOW FIBER AND TUBULAR MODULES

CROSS-REFERENCE TO RELATED APPLICATIONS

The present application claims priority to U.S. Provisional Patent Application Ser. No. 61/913,592, filed on Dec. 9, 2013 for Flow Processing and Characterization of Metal-Organic Framework (MOF) Membranes in Hollow Fiber and Tubular Modules" and to U.S. Provisional Patent Application Ser. No. 61/820,489, filed on May 7, 2013 for "Flow Processing and Characterization of Metal-Organic Framework (MOF) Membranes in Tubular and Hollow Fiber Modules."

TECHNICAL FIELD

This invention relates to a scalable, in situ flow-processing method to synthesize metal-organic framework (MOF) membranes on or inside hollow fiber and tubular modules and to characterize their molecular transport properties.

BACKGROUND OF THE INVENTION

Molecular sieving membranes have generated great interest as high-performance separation systems for production of clean and renewable fuels, building block chemicals, and specialty chemicals. Compared to thermodynamically-driven separation methods, membrane-based processes can significantly reduce the energy and capital costs of separating molecules on a large scale. For example, energy-intensive methods such as cryogenic distillation are commonly used to separate hydrocarbons because of their quite similar thermodynamic properties. Membranes composed of molecular sieving materials such as zeolites,[1] layered zeolites,[2] or metal-organic frameworks[3] (MOFs) have intrinsic advantages over polymeric membranes such as a simultaneously high permeability and selectivity. Despite their performance limitations, polymeric membranes have continued to dominate industrial membrane separations due to their relative ease of processing into morphologies such as hollow fibers.[4] The greatest scientific challenge facing molecular sieving membranes is the lack of an easily scalable, reliable, and benign fabrication process.[5] This limitation has been particularly severe for zeolite membranes, which are typically fabricated by hydrothermal synthesis on high-cost support materials.

While substantive progress is being made in gradually reducing the barriers to economical zeolitic membranes,[6-7] the advent of metal-organic framework (MOF) molecular sieves has created potential for more scalable membrane fabrication processes under relatively benign conditions.[8] MOFs consist of metal centers connected by coordination bonds to organic linker molecules, and have been used to grow crystalline membranes through techniques similar to those developed for zeolitic membranes. The zeolitic imidazolite framework (ZIF) subclass of MOFs is of particular interest for membrane fabrication, because of its tunable pore size and chemistry,[9] and relatively good thermal and chemical stability.[10-11] In an early demonstration of scalable ZIF membrane processing, we recently demonstrated the growth of ZIF-90 membranes on the outer surfaces of porous polymeric poly(amide-imide) (Torlon®) hollow fibers (~250 μm outer diameter) by a seeded growth process[12] at mild conditions (65° C. in methanol solutions). Molecular sieving membranes on the inner surfaces of the hollow fibers are much more challenging to grow but better suited for scalable fabrication and industrial uses, due to the ability to be bundled in close proximity while avoiding membrane-membrane contact points and interfaces that lead to defects during synthesis.

It has been shown that free-standing MOF films and spheroids can be synthesized at the interfaces between two immiscible solvents.[13] However, the growth of defect-controlled membranes on the inner surfaces of microscale hollow fibers (50-300 μm inner (bore) diameter) is a key, and more challenging, advance. As the bore size (and hence volume) is decreased to microscopic dimensions, the likelihood of reactant depletion and local inhomogeneity increase, leading to loss of control over membrane continuity and defect density.[14]

Thus, a new reactor cell design and processing strategy for preparing defect-controlled molecular sieving membranes on the inner surfaces of microscale hollow fibers is needed to improve performance in gas and liquid separations.

SUMMARY OF THE INVENTION

Zeolite and MOF membranes are typically synthesized in a reactor, and then removed for washing and mounting in a separate module. However, in this invention we demonstrate an in situ flow process to synthesize a membrane on or inside hollow fiber and tubular modules at a controlled location, and to subsequently activate the membrane and measure separation properties in situ without having to remove the membrane. Furthermore, damage to membranes during module construction and handling are eliminated. Lastly, this reactor cell design is capable of providing continuous flow in the bore and shell side of the hollow fiber or tubular module to allow for reagent recycling and to homogenize membrane thickness along the length. By using a single module for synthesis and characterization, membrane growth variables and post-treatments can be controlled accurately. This device also allows in situ characterization of the permeation properties of the module after each treatment step to determine cause and effect.

In other words, this reactor cell design facilitates a scalable and generalizable method of processing molecular sieving membranes (specifically, ZIF-8 membranes) referred to as an Interfacial Microfluidic Membrane Processing (IMMP) approach. The IMMP approach combines three key concepts: first, a two-solvent interfacial approach that can be tuned to achieve positional control over membrane formation (at inner and outer surfaces, as well as inside the bulk, of the porous fiber); second, supply, replenishment, and recycling of reactants at microfluidic conditions in the hollow fiber bore; and third, membrane synthesis in situ directly in the membrane module, which also functions as a membrane synthesis reactor.

Although our IMMP approach can be applied to other MOF materials, we demonstrate our key findings with the ZIF-8 membrane, which has been identified as a promising candidate for critical separations such as hydrogen from hydrocarbons, hydrogen from propane and propylene from propane.[3,15]

These and other objects, features, and advantages will become apparent as reference is made to the following detailed description, preferred embodiments, and examples, given for the purpose of disclosure, and taken in conjunction with the accompanying drawings and appended claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

For a further understanding of the nature and objects of the present inventions, reference should be made to the following detailed disclosure, taken in conjunction with the accompanying drawings, in which like parts are given like reference numerals, and wherein.

DETAILED DESCRIPTION OF PREFERRED EMBODIMENTS OF THE INVENTION

The following detailed description of various embodiments of the present invention references the accompanying drawings, which illustrate specific embodiments in which the invention can be practiced. While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled in the art to which the invention pertains. Therefore, the scope of the present invention is defined only by the appended claims, along with the full scope of equivalents to which such claims are entitled.

In this invention, we demonstrate an in situ flow process to synthesize a membrane on or inside a hollow fiber or tubular membrane module at a controlled location, and to subsequently activate the membrane and measure separation properties in situ without having to remove the membrane. By using a single module for synthesis and characterization, membrane growth variables and post-treatments can be controlled accurately. This device also allows in situ characterization of the permeation properties of the module after each treatment step to determine cause and effect.

Hollow Fiber or Tubular Membrane Module Detail

In an embodiment of the present invention, a membrane was synthesized on or inside a hollow fiber or tubular membrane module. A side perspective view of a hollow fiber or tubular membrane module 100 is depicted in FIG. 1A. As shown in FIG. 1A, the hollow fiber or tubular membrane module 100 comprises a shell 105 and a bore 110.

Figure 1B:
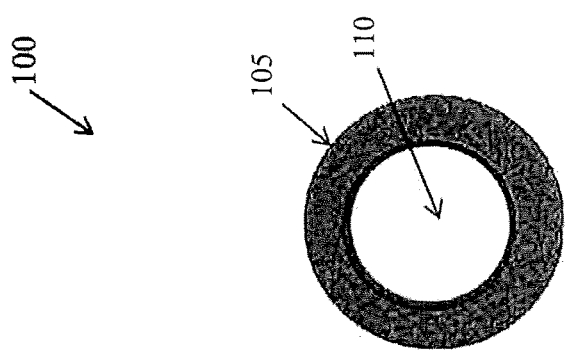
FIG. 1B illustrates a cross-sectional view of a hollow fiber or tubular membrane module showing location of a bore and a shell.
Figure 1A:
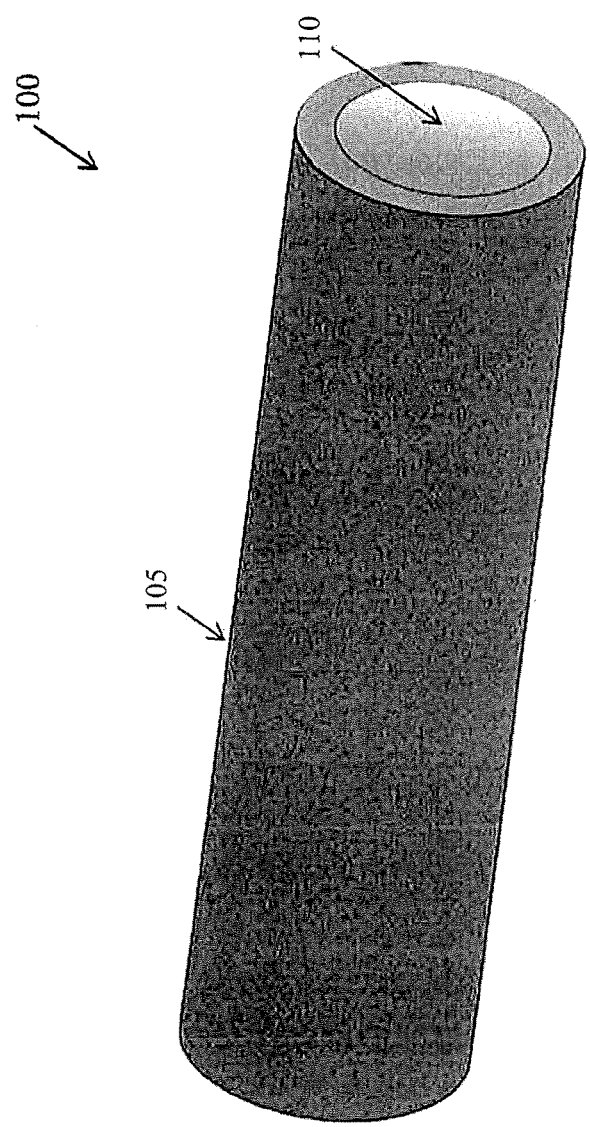
FIG. 1A illustrates a side perspective view of a hollow fiber or tubular membrane module showing location of a bore and a shell.

A cross-sectional view of a hollow fiber or tubular membrane module 100 is depicted in FIG. 1B. As shown in FIG. 1B, the hollow fiber or tubular membrane module 100 comprises a shell 105 and a bore 110. In an embodiment, the hollow fiber or tubular module may have an inner (bore) diameter of about 50 µm to about 5000 µm. In an embodiment, the hollow fiber or tubular module may have an inner (bore) diameter of about 50 µm to about 300 µm.

Design Considerations/Machining Detail for Reactor Cell

A reactor cell of the present invention may be cubic-, rectangular-, cylindrical- or cylindrical-like shaped (e.g., elliptical base), and the like. In an embodiment, a reactor module 200 was fabricated to have a base shape and a first height, and a reactor module cover 420 was fabricated to have the same base shape as the reactor module 200 and a second height. In an embodiment, the base shape may be selected from the group consisting of square, rectangular, circular and ellipse.

Suitable materials for the reactor module and/or cover include any metal, or any plastic compatible with an adhesive (e.g., epoxy), alcohol solvents and water. In an embodiment, the metal may be selected from the group consisting of stainless steel, stainless steel alloys such as MONEL® (Special Metals Corp.) and HASTALLOY® (Haynes International, Inc.), and the like. In an embodiment, the plastic may be selected from the group consisting of polyether ketone (PEEK), polymethylene (e.g., DELRIN® (DuPont Co.)), polytetrafluorethylene (PTFE) (e.g., TEFLON® (DuPont Co.)), and the like. In an embodiment, stainless steel 304 was used to fabricate the reactor module 200 and cover 420.

Figure 2:
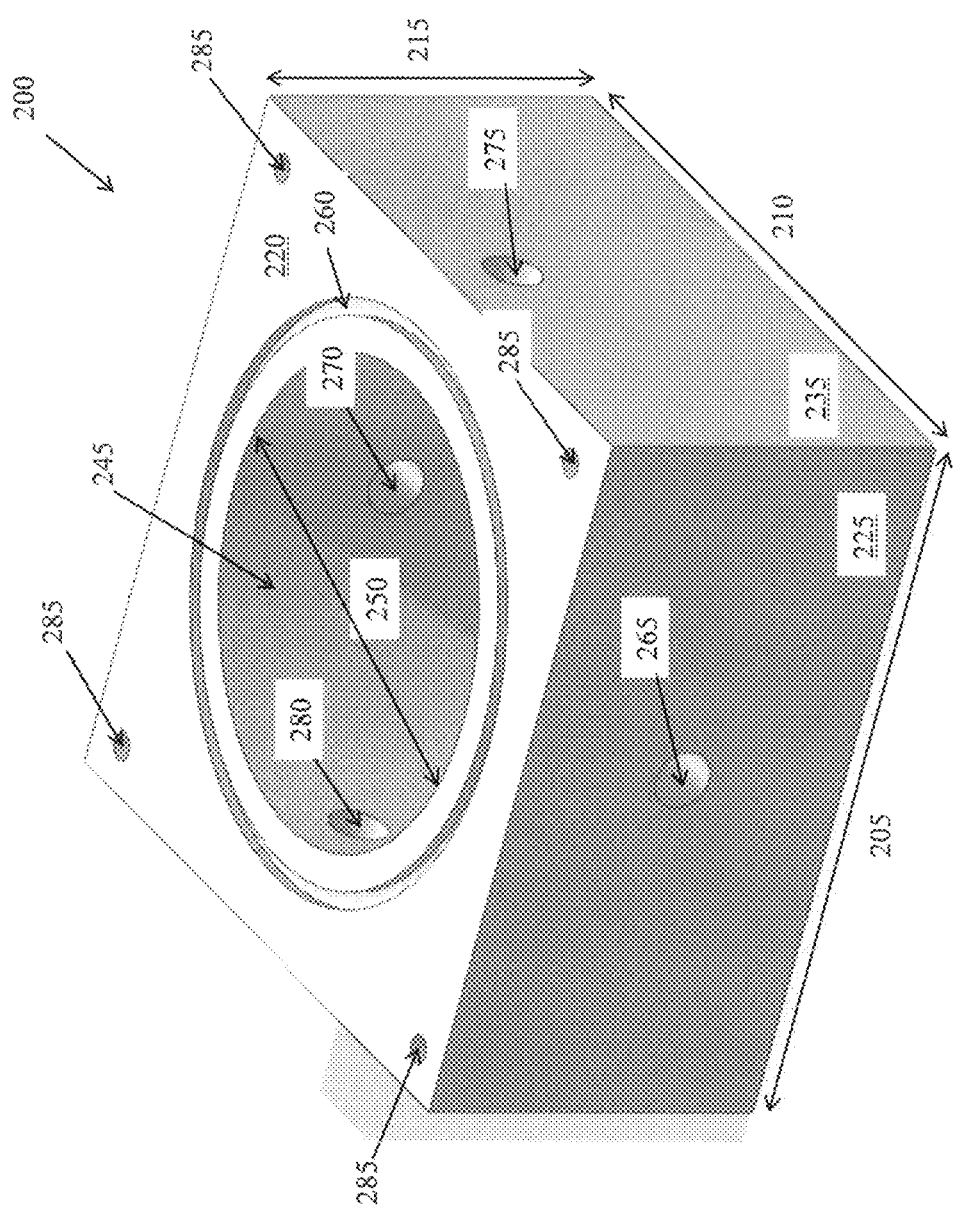
FIG. 2 illustrates an upper, right front perspective view of a reactor according to an embodiment of the present invention.
Figure 3:
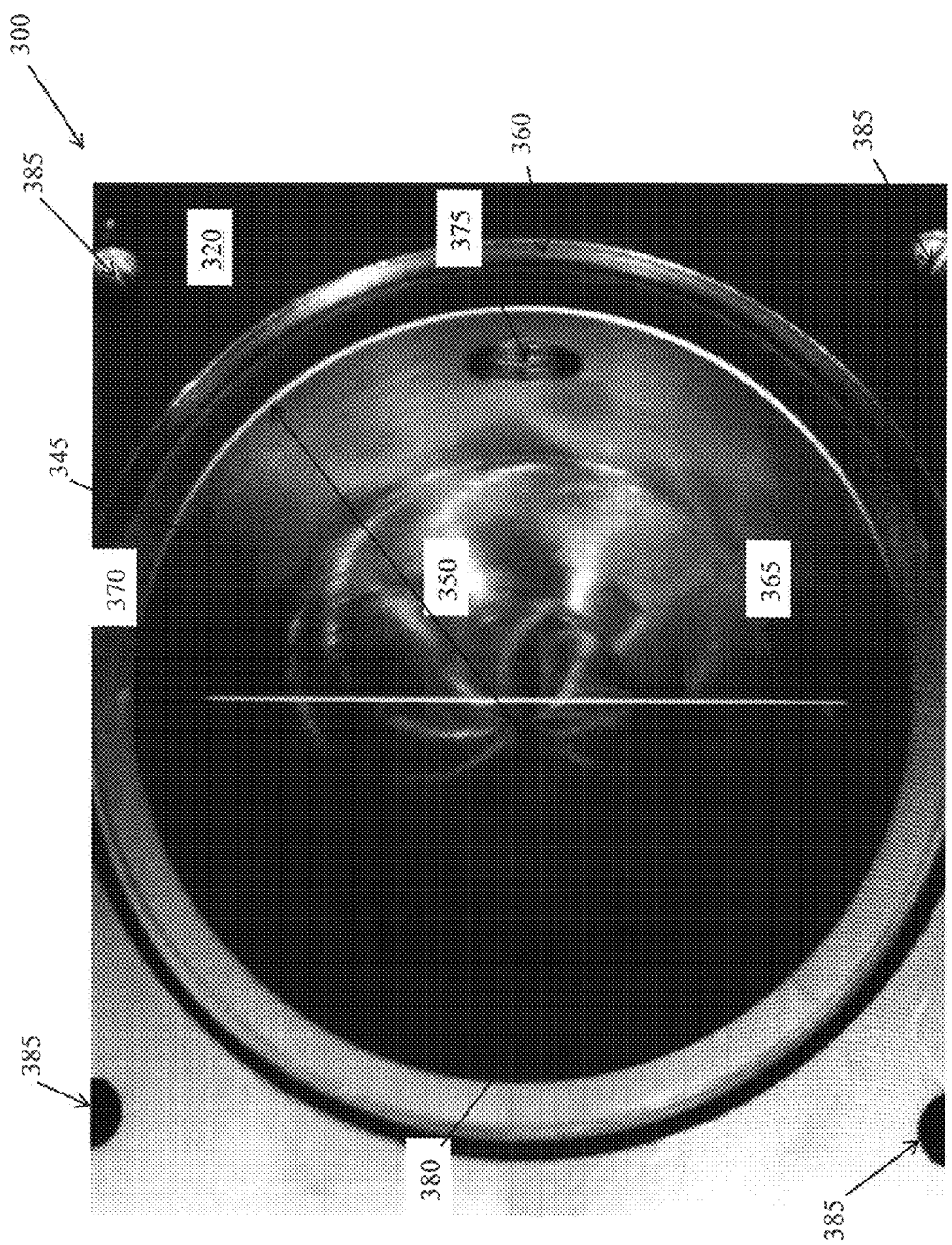
FIG. 3 illustrates a photograph of a polyamide-imide (e.g., TORLON®) hollow fiber epoxy-sealed inside a reactor according to an embodiment of the present invention.
Figure 4:
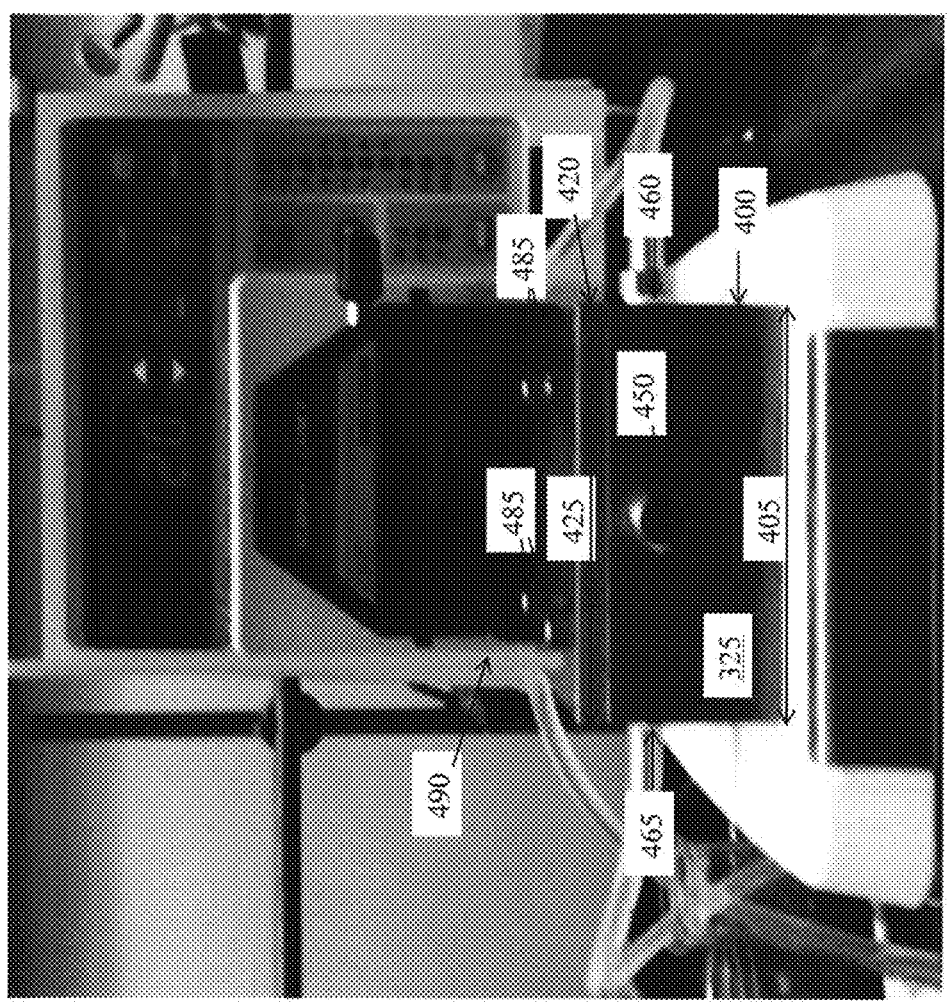
FIG. 4 illustrates a photograph of a reactor connected to cycling peristaltic pump according to an embodiment of the present invention.

Although a rectangular reactor module 200 and cover 420 are depicted in FIGS. 2-4, a person of ordinary skill in the art could easily adapt these teachings to cubic, cylindrical and cylindrical-like reactor modules and covers. Accordingly, although the rectangular reactor module 200 and cover 420 are discussed in detail below, this discussion should not be interpreted to exclude cubic, cylindrical and cylindrical-like reactor modules and covers.

Although the reactor module and cover were machined from metal blocks, a person of ordinary skill in the art (POSITA) could easily adapt these teaching to other suitable methods of fabricating parts. In an embodiment, the fabrication method may be selected from machining, molding, printing and combinations thereof. For example, if a plastic material is used, the reactor module and cover may molded by compression or injection molding or printed on a 3-D printer as customary in the art. Accordingly, although machining is discussed in detail below, this discussion should not be interpreted to exclude molding and printing techniques.

An upper, right front perspective view of a reactor module 200 is depicted in FIG. 2. As shown in FIG. 2, the reactor module 200 has a first length 205, a second length 210 and a third length 215. Further, the reactor module 200 has an upper surface 220, a first side surface 225, a second side surface 230 (not shown), a third side surface 235 and a fourth side surface 240 (not shown). The reactor module 200 may be constructed from a metal or a plastic as discussed above. In an embodiment, the reactor module 200 was constructed from stainless steel 304.

The reactor module 200 has a reactor chamber 245 with a reactor chamber diameter 250 and reactor chamber depth 255 (not shown) extending into the reactor module 200 from the upper surface 220. Further, the reactor module 200 has an O-ring groove 260 extending into the reactor module 200 from the upper surface 220 and surrounding the reactor chamber 245.

In an embodiment, the reactor chamber may be cylindrical. In such cylindrical embodiment, the inner diameter of the O-ring groove 260 is slightly larger than and offset from the reactor chamber diameter 250.

In an embodiment, the rector chamber may not be cylindrical. For such non-cylindrical embodiments, an O-ring groove with an inner dimension slightly larger than and offset from an outer dimension of the reactor chamber may be machined in the upper surface of the reactor module.

In an embodiment, the reactor module 200 has a temperature probe chamber 290 (not shown) with a temperature probe diameter 295 (not shown) and a temperature probe depth (not shown) extending into the reactor module 200 from the upper 220 or first side 225, second side 230, third side 240, fourth side 245 surface. Suitable temperature probes 490 include resistance temperature detectors (RTDs), thermocouples, thermometers, and the like.

The reactor module 200 has a plurality of holes 285 extending into the reactor module 300 material from the upper surface 225 to attach a reactor module cover (not shown). In an embodiment, if the temperature probe chamber 290 extends into the reactor module 200 from the upper surface 220, the reactor module cover 420 will have a temperature probe hole with a temperature probe diameter 295 extending through the reactor module cover 420 and aligning with the temperature probe diameter 295 of the temperature probe chamber 290 in the reactor module 200. The reactor module cover 420 may be constructed from a metal or a plastic as discussed above. In an embodiment, the reactor module 200 was constructed from stainless steel 304.

The reactor module 200 has a first hole 265 extending into the reaction chamber 245 from a first side surface 225, a second hole 270 extending into the reaction chamber 245 from a second side surface 230 (not shown), a third hole 275 extending into the reaction chamber 245 from a third side surface 235, and a fourth hole 280 extending into the reaction chamber 245 from a fourth side surface 240 (not shown).

In an embodiment, the first 265 and second 270 holes may extend only partially into the first 225 and second 230 side surfaces, respectively, of the reactor chamber 245 such that a first and second smaller hole may extend into the reaction chamber 245 to accept a hollow fiber or tubular membrane module 100 as shown in FIG. 3. In an embodiment, the hollow fiber or tubular membrane module 100 may be held (and sealed) in place in the first and second smaller holes with an adhesive such as an epoxy. In an embodiment, the first 265, second 270, third 275 and fourth 280 holes are threaded to accept various fittings as are customarily used in the art.

In an embodiment, the third 275 and fourth 280 holes extending into the third 235 and fourth 240 side surfaces of the reactor module 200 (i.e., surfaces perpendicular to the mounted hollow fiber or tubular membrane module 100) may be slightly offset either vertically or horizontally from each other to facilitate mixing during flow conditions.

For example, a laboratory-scale reactor module 300 was constructed from a rectangular stainless steel block with a first length 305 of about 3-inches, a second length 310 of about 3-inches and a third length 315 of about 1.5-inches as depicted in FIGS. 3-4. A reactor chamber 345 with reactor chamber diameter 350 of about 2-inches and a depth of about 1.38-inches was machined into the center of the stainless steel block. Next, first 365, second 370, third 375 and fourth 380 holes were drilled for ⅛-inch NPT fittings through the first 325 (not shown), second 330 (not shown), third 335 (not shown) and fourth 340 (not shown) side surfaces of the stainless steel block. Although ⅛-inch NPT fittings were used, a POSITA could easily adapt this teaching to other fittings. Accordingly, although the ⅛-inch NPT fittings are disclosed, this disclosure should not be interpreted to exclude other fittings.

The first 365 and second 370 holes extended only partially into the first 325 and second 330 side surfaces, respectively, of the reactor chamber 345 such that a first and second smaller holes with a diameter of about 0.5 mm extended into the reaction chamber 345 to accept a hollow fiber or tubular membrane module 100 as shown in FIG. 3. In an embodiment, the first 365 and second 370 holes extended into the first 325 and second 330 side surfaces, respectively, at a height of about 1-inch such that about 0.1-inch wall remained and second smaller holes with a diameter of about 0.02-inch were drilled through the 0.1-inch wall to create an aperture for mounting the hollow fiber or tubular membrane module 100. These smaller holes may be used to support the hollow fiber or tubular membrane module 100. The hollow fiber or tubular membrane module 100 may be mounted (and sealed) in place in the first and second smaller holes with an adhesive such as an epoxy.

Although the smaller holes were used to support the hollow fiber or tubular membrane, a person of ordinary skill in the art (POSITA) could easily adapt these teachings to use an insert to support the hollow fiber or tubular membranes(s) or to bundle the hollow fiber or tubular membranes such that the smaller holes are unnecessary. Accordingly, although smaller holes are discussed in detail above, this discussion should not be interpreted to exclude other techniques of the supporting the hollow fiber or tubular membrane.

The third 375 and fourth 380 holes extending into the third 335 and fourth 340 side surfaces, respectively, of the reactor module 300 (i.e., surfaces perpendicular to the mounted hollow fiber or tubular membrane module 100) were offset vertically from each other by about ⅛ to ¼-inch to facilitate mixing during flow conditions. In an embodiment, the third 375 and fourth 380 holes extended into the third 335 and fourth 340 sides, respectively, at a height of about 1⅛-inch such that the third 375 and fourth 380 holes extended into the reaction chamber 345.

In an embodiment (not shown), the first hole 365 may extend into the reactor chamber 345 from the first side surface 325, the second hole 370 opposing the first hole 365 may extend into the reactor chamber 345 from the second surface 330, the third hole 375 may extend into the reactor chamber 345 from the first surface 325 and the fourth hole 380 opposing the third hole 375 may extend into the reactor chamber 345 from the second surface 330.

In an embodiment (not shown), the first hole 365 may extend into the reactor chamber 345 from the first side surface 325, the second hole 370 opposing the first hole 365 may extend into the reactor chamber 345 from the second surface 330, the third hole 375 may extend into the reactor chamber 345 from an upper surface of a reactor module cover 420 and the fourth hole 380 opposing the third hole 375 extends into the reactor chamber 345 from a bottom surface of the reactor chamber 345.

Although a few possible alternative configurations for an inlet (i.e., third hole 375) and an outlet (i.e., fourth hole 380) for an outer (shell) side solution have been discussed above, a POSITA could easily adapt this teaching to other designs. For example, the inlet and the outlet of the outer (shell) side solution may be positioned to create turbulent flow.

As depicted in FIG. 4, the reactor module 400 must be airtight to be used to measure gas and liquid permeation. To provide an airtight seal, an O-ring groove 360 with a diameter of about 2¼-inches and cross-section of about 0.06-inches (AS568-035) was machined in the upper surface 320 of the reactor module 300 to receive an O-ring (see FIG. 3).

In an embodiment, the reactor chamber may not be cylindrical. For such non-cylindrical embodiments, an O-ring groove with an inner dimension slightly larger than and offset from an outer dimension of the reactor chamber may be machined in the upper surface of the reactor module.

A plurality of threaded holes 385 were machined into each corner of the upper surface 320 of the reactor module 300, 400 about 0.35-inches away from the O-ring groove 360 to receive a plurality of 10-32 hexagonal screws 485 as shown in FIGS. 3-4. Although 10-32 hexagonal screws were used to secure a reactor module cover 420 (see FIG. 4) to the reactor module 300, a POSITA could easily adapt this teaching to other fasteners. Accordingly, although the 10-32 hexagonal screws are discussed in detail, this discussion should not be interpreted to exclude other fasteners.

A temperature probe chamber 290 with temperature probe diameter 295 was machined in the reactor module 300, 400 outside of the O-ring groove 360 to receive a temperature probe 490 as shown in FIGS. 2-4. As shown in FIG. 4, the temperature probe 490 (e.g., heat probe, thermometer) is inserted in the temperature probe chamber 290. Suitable temperature probes 490 include heat probe, resistance temperature detectors (RTDs), thermocouples, thermometers, and the like.

A rectangular block was used to fabricate a reactor module cover 420. A photograph of a reactor module 400 and cover 420 is depicted in FIG. 4. As shown in FIG. 4, the reactor module cover 420 has a first length 425 of about 3-inches, a second length 430 (not shown) of about 3-inches and a third length 435 (not shown) of about ¼-inch. A plurality of holes (not shown) was machined in the reactor module cover 420 extending through the cover 420 and aligning with the diameters of the threaded holes 385 in the reactor module 400. In an embodiment, the reactor module cover 420 was constructed from stainless steel 304.

A temperature probe hole (not shown) was machined in the reactor module cover 420 extending through the cover 420 and aligning with the temperature probe diameter 295 of the temperature probe chamber 290 in the reactor module 400. As illustrated in FIG. 4, the temperature probe 490 (e.g., heat probe, thermometer) is inserted in the temperature probe hole (not shown) of the cover 420 and into the temperature probe chamber 290 (not shown) of the reactor module 400. Suitable temperature probes 490 include heat probes, resistance temperature detectors (RTDs), thermocouples, thermometers, and the like.

The reactor module cover 420 provides a flange-seal by tightening the cover 420 onto the reactor module 400 via the plurality of 10-32 hexagonal screws 485.

Temperature Control of Reactor Cell/Module

The reactor module 400 may be heated and/or cooled to a temperature between about 0° C. and about 200° C. As shown in FIG. 4, the laboratory-scale reactor module 400 was placed on a stir plate, and heated to about 30° C. with a temperature probe 490. In an embodiment, the temperature probe 490 was set at about 30° C. and inserted into the temperature probe chamber 290 of the reactor module 400.

Although a temperature probe 490 was used to heat the reactor module 400, a POSITA could easily adapt this teaching to other heating and/or cooling methods. Accordingly, although the temperature probe heating method is discussed in detail, this discussion should not be interpreted to exclude other heating and/or cooling methods. For example, suitable heaters include temperature probes, hot plates, heating coils, enclosure heaters, silicone rubber heaters, polyester heaters, polyimide heaters, strip heaters, band heaters, tubular heaters, cartridge heaters, and the like. For example, suitable coolers include liquid baths, cooling coils, enclosure coolers, thermoelectric coolers, thermoelectric chillers, heat sinks, fans, and the like.

The temperature of the reactor module 400 may be set with a temperature probe 490 or measured with a thermometer. Although a temperature probe 490 was used, a POSITA could easily adapt this teaching to other combinations of heaters (discussed above) and temperature probes. Suitable temperature probes 490 include resistance temperature detectors (RTDs), thermocouples, thermometers, and the like.

Mounting/Sealing Hollow Fiber in Reactor Cell/Module

A length of a hollow fiber or tubular membrane module 100 may be threaded through the first and second smaller holes in the reactor module 200, 300. In an embodiment, a porous polyamide-imide (e.g., TORLON® (Solvay Advanced Polymers)) hollow fiber 100 with a length of about 4-inches was threaded through the first and second smaller holes of the reactor module 200, 300.

The hollow fiber or tubular membrane module 100 may be mounted (and sealed) in place in the first and second smaller holes with an adhesive such as an epoxy. In an embodiment, the hollow fiber 100 was held (and sealed) in place in the first and second smaller holes with a small drop of epoxy on the shell of each fiber where the fiber passes through the aperture. After the epoxy was allowed to cure for about 90 minutes, the excess fiber ends were removed with tweezers, taking care not to crush or block the fiber ends. In an embodiment, a plurality of hollow fibers 100 may be mounted (and sealed) using this same method.

To ensure that the mounted hollow fiber(s) 100 was/were properly sealed and that the ends were not crushed or blocked, the reactor module 400 should be tested for use as a permeation cell by measuring the leak rate and the $N_2$ permeances of the mounted fiber(s), as discussed below.

Performance as Permeation Cell

The reactor module 400 was tested for use as a permeation cell by measuring the leak-rate and the permeance of a known standard. Using a porous polyamide-imide (e.g., TORLON®) hollow fiber as a standard, a $N_2$ permeance of 53,000 GPU, which is consistent with the reported values in the literature, was measured with the reactor cell 400.[12,16] Based on flow-based leak tests, the leak-rate was determined to be less than 0.1 psi/hour.

Constant Flow Synthesis of ZIF-8 Membranes

Using a macroporous polyamide-imide (e.g., TORLON®) hollow fiber and the material ZIF-8 as an archetype for a hollow fiber or tubular membrane synthesis, a series of constant flow membrane synthesis experiments were performed. Several examples of ZIF-8 membrane fabrication using this reactor module 400 are described below, and their results are shown in the SEM micrographs of FIGS. 5-8.

Performance in Membrane Synthesis: Static Conditions

Starting with a seeded polyamide-imide (e.g., TORLON®) hollow fiber 100 mounted in the reactor module 400,[12] an aqueous synthesis gel consisting of about 0.22 g Zinc nitrate hexahydrate ($Zn^{+2}$) in about 40 mL of deionized water (DI) (about 0.018 mol/L) and about 9 g 2-methyl imidazole (mIm) in about 80 mL deionized water (DI) (about 1.37 mol/L) was poured on the outer (shell) side surface 105 of the hollow fiber 100. After 6 hours at 30° C., the shell solution was removed and the hollow fiber 100 was thoroughly rinsed with deionized water (DI) and methanol.

Figure 5B:
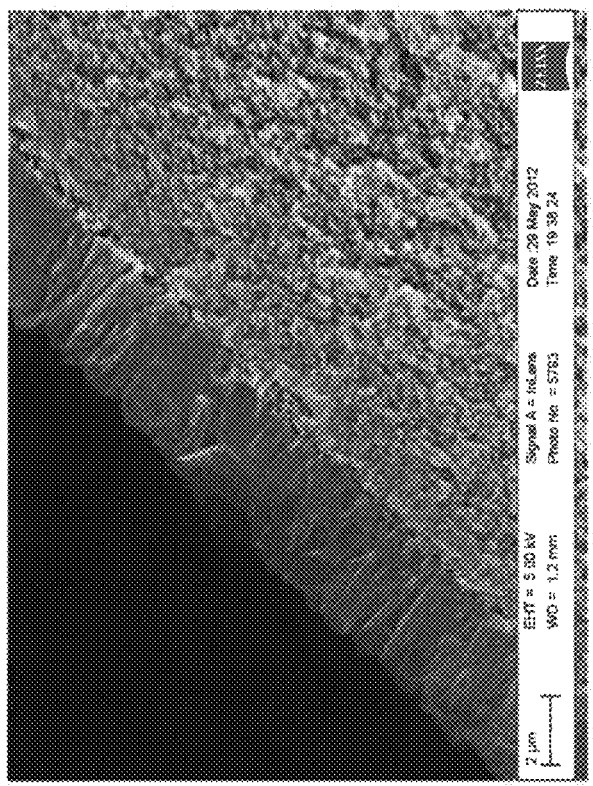
FIG. 5B illustrates a top-view of a SEM micrograph of a ZIF-8 membrane grown on outer (shell) side surface of a seeded polyamide-imide (e.g., TORLON®) hollow fiber.
Figure 5A:
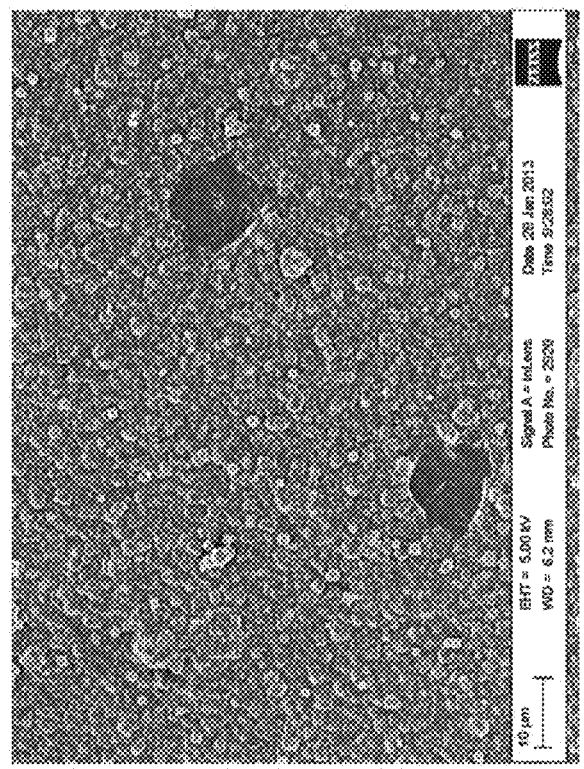
FIG. 5A illustrates a cross-sectional view of a SEM micrograph of a ZIF-8 membrane grown on an outer (shell) side surface of a seeded polyamide-imide (e.g., TORLON®) hollow fiber.

A cross-sectional view of a SEM micrograph of a ZIF-8 membrane grown on an outer (shell) side surface of a seeded polyamide-imide (e.g., TORLON®) hollow fiber is shown in FIG. 5A; and a top view of a SEM micrograph of the ZIF-8 membrane grown on the outer (shell) side surface 105 of the seeded polyamide-imide (e.g., TORLON®) hollow fiber is shown in FIG. 5B. Based upon FIGS. 5A-5B, the ZIF-8 membrane is formed on the outer (shell) side surface 105 of the hollow fiber 100.

Performance in Membrane Synthesis: Flow Conditions

Reactions that are performed under flowing conditions are easier to control and allow recycling; therefore, ZIF-8 membranes were grown by flowing reagents through the bore 110 of the hollow fiber 100 (see FIGS. 6-7).

First, an aqueous $Zn^{+2}$ solution containing about 0.22 g Zinc nitrate hexahydrate ($Zn^{+2}$) in about 40 mL deionized water (DI) (about 0.018 mol/L) was flowed through the bore 110 at 2 mL/min while an aqueous mIm solution containing 9 g mIm in about 80 mL deionized water (DI) (about 1.37 mol/L) was poured on the outer (shell) side surface 105. The reaction was stopped after 6 hours and the hollow fiber 100 was rinsed with deionized water (DI) and methanol.

Figures 6A, 6B:
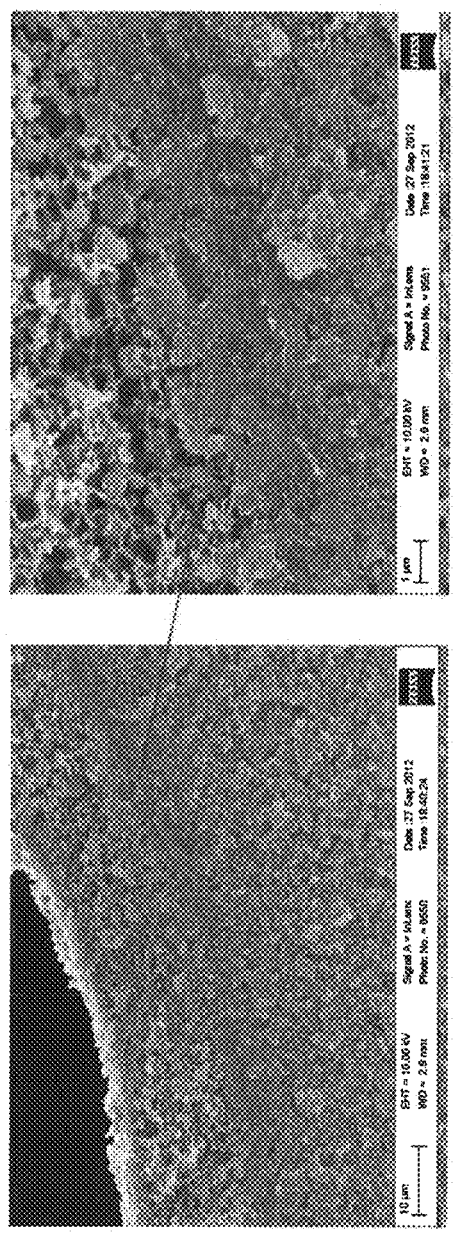
FIG. 6A illustrates a cross-sectional view of a SEM micrograph of a ZIF-8 membrane grown on a polyamide-imide (e.g., TORLON®) hollow fiber under aqueous flow conditions.
FIG. 6B illustrates a detailed cross-sectional view of a SEM micrograph of a ZIF-8 membrane grown on a polyamide-imide (e.g., TORLON®) hollow fiber under aqueous flow conditions.

A cross-sectional view of a SEM micrograph of a ZIF-8 membrane grown under aqueous flow conditions is shown in FIG. 6A; and a detailed (10×) cross-sectional view of the SEM micrograph of the ZIF-8 membrane grown under aqueous flow conditions is shown in FIG. 6B. Based upon FIGS. 6A-6B, the ZIF-8 membrane is formed on the inner (bore) side surface 110 of the hollow fiber 100.

To determine the effect of solvent, the aforementioned experiment was repeated using a different solvent (i.e., 1-octanol).

Second, a $Zn^{+2}$/1-octanol solution containing about 0.22 g Zinc nitrate hexahydrate ($Zn^{+2}$) in about 40 mL 1-octanol (about 0.018 mol/L) was flowed through the bore 110 at 2 mL/min while a mIm/1-octanol solution containing about 9 g mIm in about 80 mL 1-octanol (about 1.37 mol/L) was poured on the outer (shell) side surface 105. The reaction was stopped after 6 hours and the hollow fiber 100 was rinsed with deionized water (DI) and methanol.

Figure 7B:
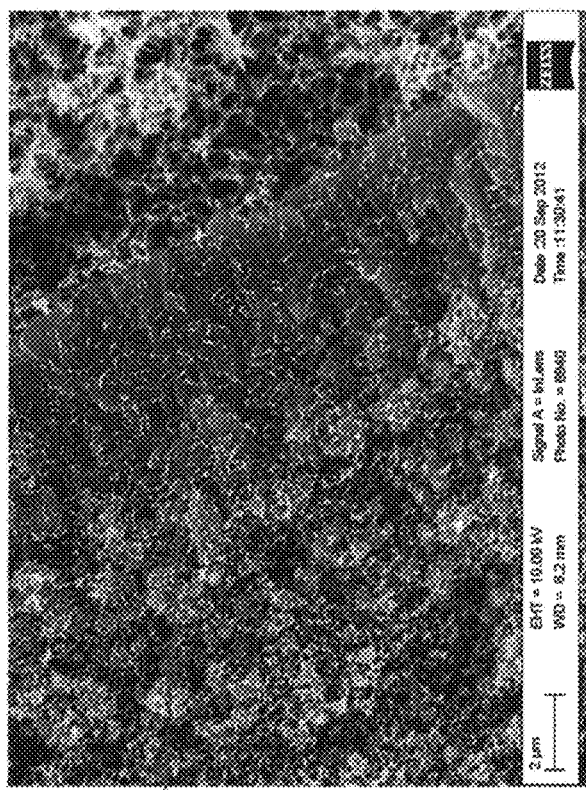
FIG. 7B illustrates a detailed cross-sectional view of a SEM micrograph of ZIF-8 membrane grown on a polyamide-imide (e.g., TORLON®) hollow fiber under 1-octanol flow conditions.
Figure 7A:
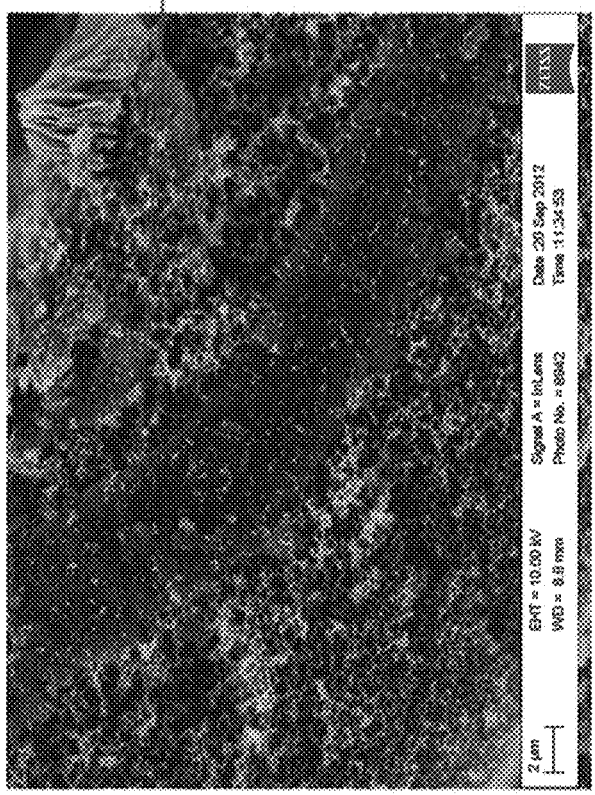
FIG. 7A illustrates a cross-sectional view of a SEM micrograph of a ZIF-8 membrane grown on a polyamid-imide (e.g., TORLON®) hollow fiber under 1-octanol flow conditions.

A cross-sectional view of a SEM micrograph of a ZIF-8 membrane grown under 1-octanol flow conditions is shown in FIG. 7A; and a detailed (10×) cross-sectional view of the SEM image of the ZIF-8 membrane grown under 1-octanol flow conditions is shown in FIG. 7B. Based upon FIGS. 7A-7B, the ZIF-8 membrane is formed on the inner (bore) side surface 110 of the hollow fiber 100.

Accordingly, for both the aqueous (see FIG. 6) and 1-octanol (see FIG. 7) flow systems, the ZIF-8 membrane growth was observed in the inner (bore) side surface 110 of the hollow fiber 100 instead of on the outer (shell) side surface 105.

Performance in Membrane Synthesis: Interfacial Synthesis

The next experiment involved using interfacial synthesis technique whereby immiscible solvents are used as a means to physically separate the organic and inorganic precursors. Specifically, a $Zn^{+2}$/1-octanol solution containing about 0.22 g Zinc nitrate hexahydrate ($Zn^{+2}$) in about 40 mL 1-octanol (about 0.018 mol/L) was flowed at 2 mL/min through the bore 110 while an aqueous mIm solution containing about 9 g mIm in about 80 mL deionized water (DI) (about 1.37 mol/L) was poured into the reactor chamber 345 immersing the outer (shell) side surface 105 of the hollow fiber 100. The reaction was stopped after 6 hours and the hollow fiber 100 was flushed with neat 1-octanol, heptane, and deionized water (DI).

To determine the effect of flow rate, the aforementioned experiment was repeated using a slower flow rate (1 µL/min).

Figure 8B:
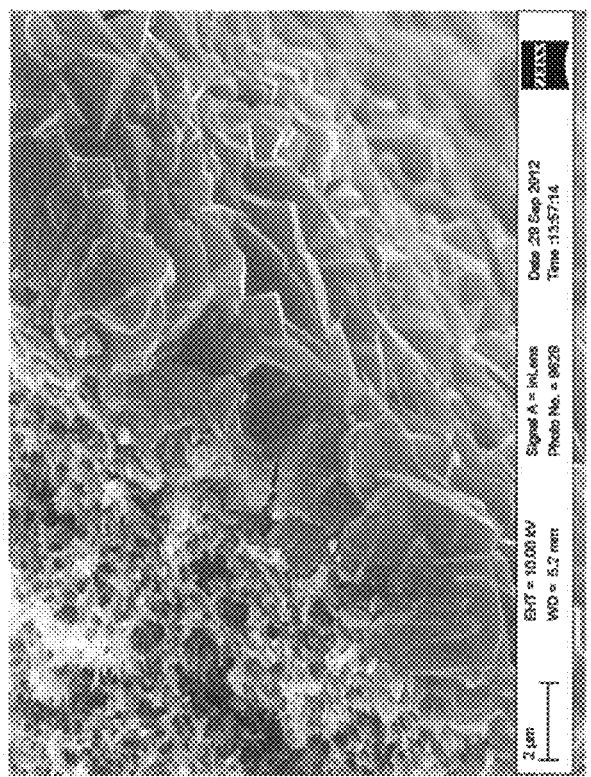
FIG. 8B illustrates a cross-sectional view of a SEM micrograph of a ZIF-8 membrane grown on a polyamide-imide (e.g., TORLON®) hollow fiber using the IMMP approach with 1 μL/min flow rate of a $Zn^{+2}$/1-octanol bore solution and an aqueous mIm shell solution according to an embodiment of the present invention.
Figure 8A:
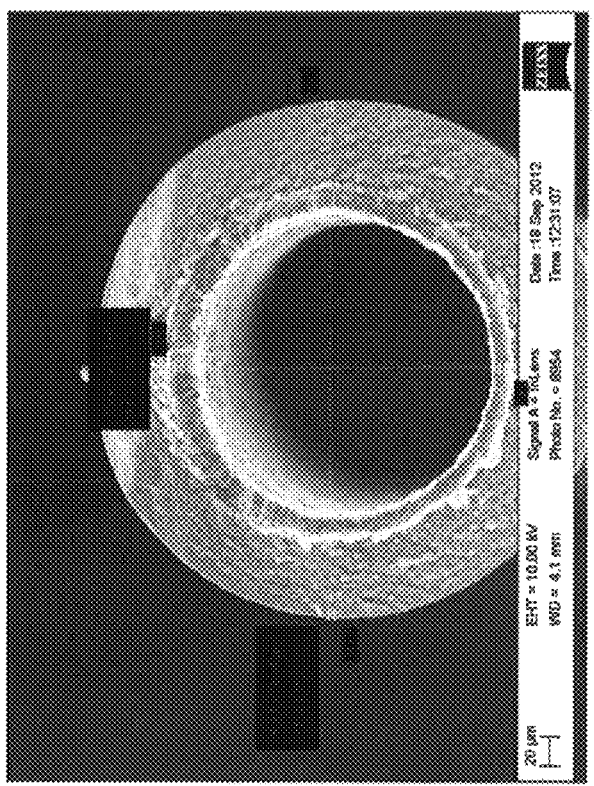
FIG. 8A illustrates a cross-sectional view of a SEM micrograph of a ZIF-8 membrane grown on a polyamide-imide (e.g., TORLON®) hollow fiber using an Interfacial Microfluidic Membrane Processing (IMMP) approach with 2 mL/min flow rate of a $Zn^{+2}$/1-octanol bore solution and an aqueous 2-methyl imidazole (mIm) shell solution according to an embodiment of the present invention.

A cross-sectional view of a SEM micrograph of a ZIF-8 membrane grown under 1-octanol flow conditions of 2 mL/min bore flow rate, using an interfacial system is shown in FIG. 8A; and a cross-sectional view of the SEM micrograph of the ZIF-8 membrane grown under 1-octanol flow conditions of 1 µL/min bore flow rate, using the interfacial system is shown in FIG. 8B.

Accordingly, for the interfacial system, both the 2 mL/min (see FIG. 8A) and 1 μL/min (see FIG. 8B) bore flow rates, the ZIF-8 membrane growth was observed in the interior (bore) side surface 110 of the hollow fiber 100 instead of on the outer (shell) side surface 105.

Table 1 shows the measurement of single-component gas permeation properties of three of the ZIF-8 membranes using the reactor module 400. The entire process of membrane formation and permeation measurement can be done in situ within the same pre-fabricated reactor module 400, thereby avoiding the difficulties associated with previous membrane fabrication processes.

TABLE 1

Measurement of Single-Component Gas Permeation Properties for In-Situ grown ZIF-8 Membrane

| Example | Support | Flow Rate | Thickness (μm) | Permeance (GPU) | | Selectivity |
|---|---|---|---|---|---|---|
| | | | | $N_2$ | $SF_6$ | $N_2/SF_6$ |
| ZIF-8_Outer (see FIGS. 5A-5B) | Torlon Tube | Static | 3 | 800 | 430 | 1.9 |
| ZIF-8_Inner_1 (see FIG. 8A) | Torlon Tube | 2 mL/min | 5-15 | 240 | 100 | 2.4 |
| ZIF-8_Inner_2 (see FIG. 8B) | Torlon Tube | 1 μL/min | 2-3 | 320 | 60 | 5.3 |

Figure 9:
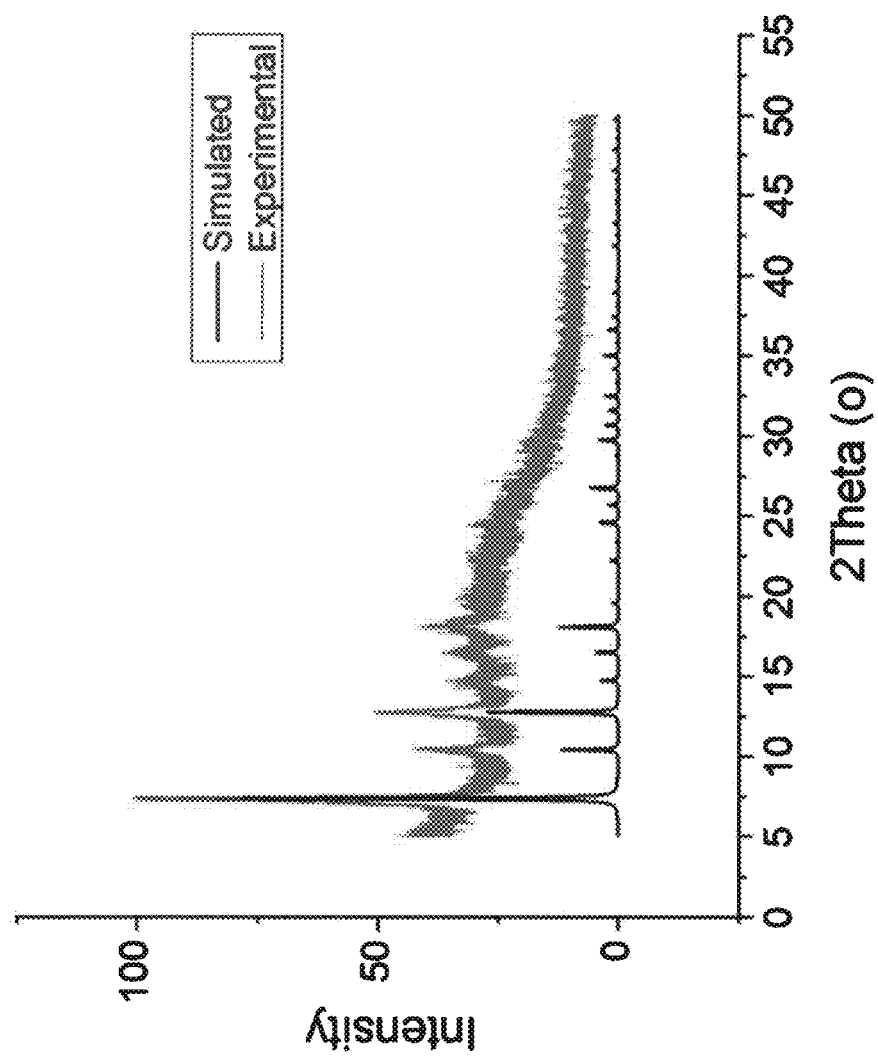
FIG. 9 illustrates a X-ray Diffraction (XRD) chart of 2Theta (°) vs. Intensity for simulated and experimental ZIF-8 membranes, confirming structure of supported ZIF-8 membranes.

An X-ray Diffraction (XRD) chart of 2Theta (°) vs. intensity for simulated and experimental ZIF-8 membranes, confirming the structure of supported ZIF-8 membranes is shown in FIG. 9.

Figure 10:
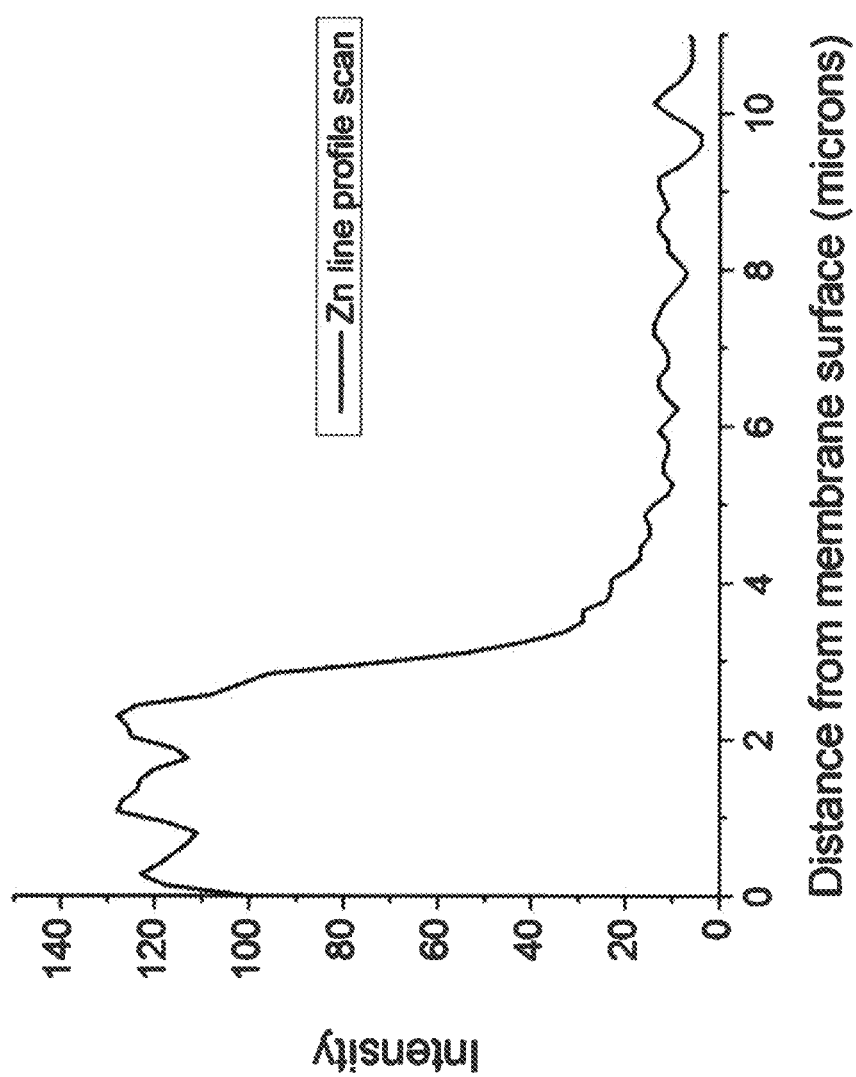
FIG. 10 illustrates an Energy Dispersive X-ray Spectroscopy (EDS) Zinc line profile scan chart of Distance from membrane surface (μm (microns)) vs. Intensity, depicting thickness of membrane to be ~3 μm.

An EDS Zinc line profile scan of distance from membrane surface (μm (microns)) vs. intensity, depicting the thickness of the ZIF-8 membrane to be about 3 μm is shown in FIG. 10.

Performance in Membrane Synthesis: Static, Continuous and Pulsed Flow Conditions In an embodiment, ZIF-8 membranes were grown by flowing reagents through the bore 110 of the hollow fiber 100 (see FIGS. 6-7, 18B-18C) under static, continuous and pulsed flow conditions. See FIGS. 11-12 & 18A.

First, a $Zn^{+2}$/1-octanol solution containing about 0.22 g Zinc nitrate hexahydrate ($Zn^{+2}$) in about 40 mL 1-octanol (about 0.018 mol/L) was continuously flowed through the bore 110 at about 60 μL/hour while an aqueous mIm solution containing about 9 g mIm in about 80 mL deionized water (DI) (about 1.37 mol/L) was poured on the outer (shell) side surface 105. The reaction was stopped after about 9 hours and the hollow fiber 100 was rinsed with 1-octanol, heptanes, deionized water (DI) and methanol.

Second, a $Zn^{+2}$/1-octanol solution containing about 0.22 g Zinc nitrate hexahydrate ($Zn^{+2}$) in about 40 mL 1-octanol (about 0.018 mol/L) was held static in the bore 110 while an aqueous mIm solution containing about 9 g mIm in about 80 mL deionized water (DI) (about 1.37 mol/L) was poured on the outer (shell) side surface 105. The reaction was stopped after about 9 hours and the hollow fiber 100 was rinsed with 1-octanol, deionized water (DI), heptanes and methanol.

Figure 11:
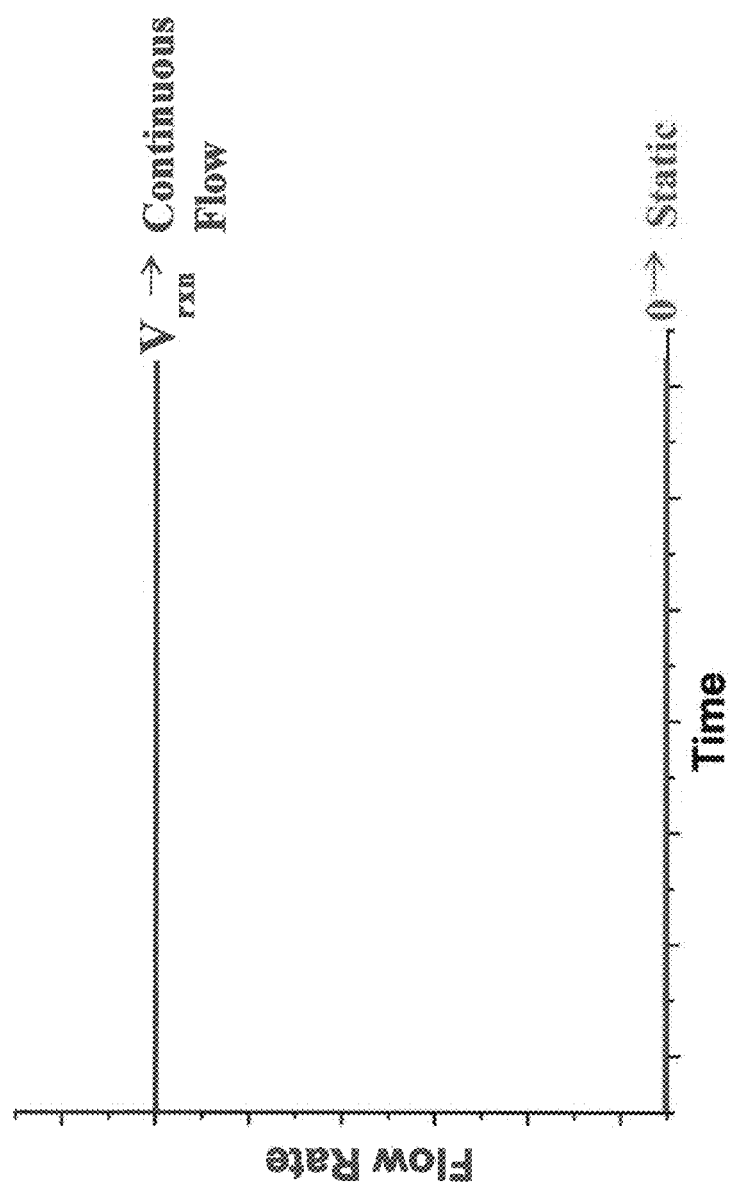
FIG. 11 illustrates a chart of Time vs. Flow Rate for static and continuous flow conditions, showing static growth conditions.

A chart of Time vs. Flow Rate static and continuous flow through the bore 110 of the hollow fiber 100 is illustrated in FIG. 11. No continuous ZIF-8 membrane was formed on the inside of the bore 110 of the hollow fiber 100 under static conditions. In contrast, a continuous ZIF-8 membrane was formed on the inside of the bore 110 of the hollow fiber 100 by continuously flowing bore solution at about 60 μL/hour, however, the membrane had a low $H_2/C_3H_8$ selectivity.

Figure 12:
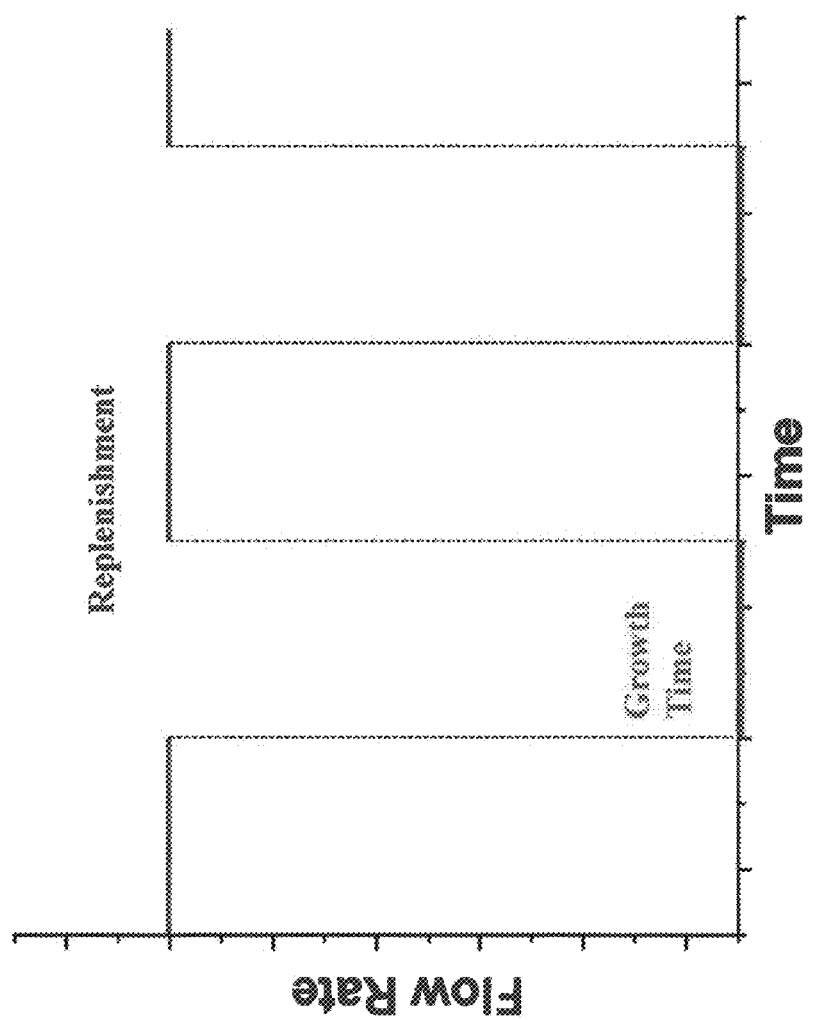
FIG. 12 illustrates a chart of Time vs. Flow Rate for pulsed flow conditions, showing growth and replenishment conditions.
Figure 13:
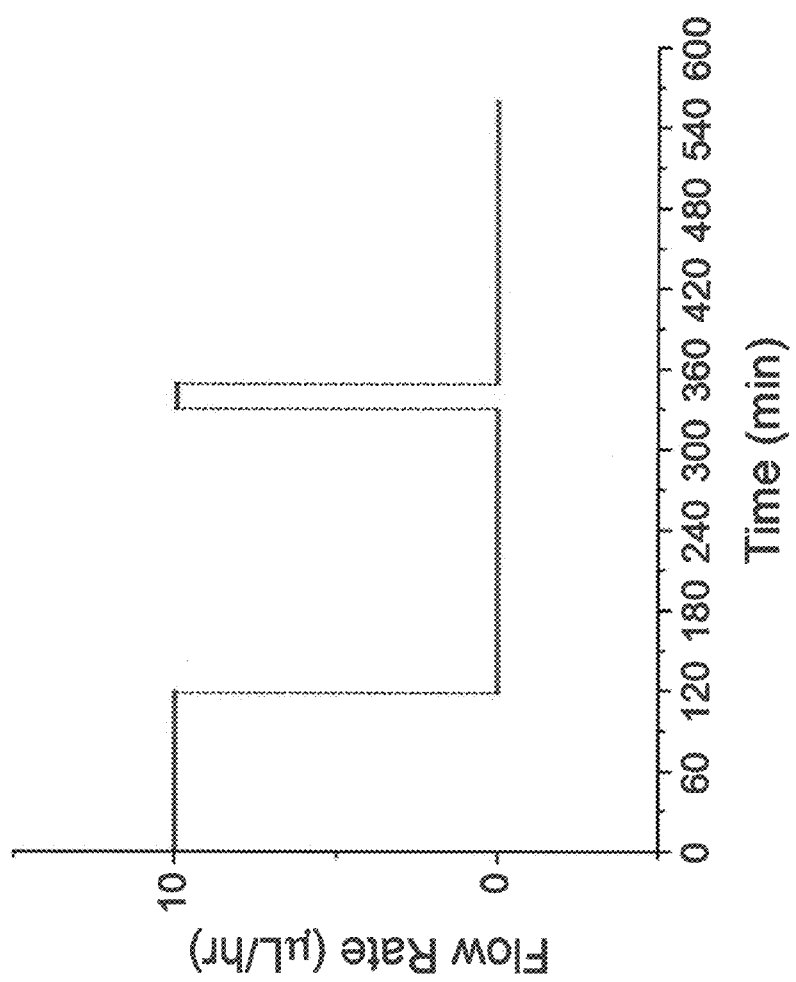
FIG. 13 illustrates a chart of Time (min.) vs. Flow Rate (μL/hour) for pulsed flow conditions, showing growth, static growth and replenishment conditions.

A chart of Time vs. Flow Rate for pulsed flow conditions through the bore 110 of the hollow fiber 100 is illustrated in FIG. 12. Under pulsed flow conditions, a ZIF-8 membrane was formed on the inside of the bore 110 of the hollow membrane 100, and, further, the pulsed-flow membrane had a higher $H_2/C_3H_8$ selectivity than the continuous-flow membrane discussed above.

To further test the effect of flow conditions, the aforementioned experiment was repeated using a one phase aqueous solvent system, a single phase organic solvent system (1-octanol), and a biphasic interfacial solvent system (aqueous/1-octanol), respectively.

First, an aqueous $Zn^{+2}$ solution containing about 0.22 g Zinc nitrate hexahydrate ($Zn^{+2}$) in about 40 mL deionized water (DI) (about 0.018 mol/L) was flowed through the bore 110 at about 10 μL/hour while an aqueous mIm solution containing about 9 g mIm in about 80 mL deionized water (DI) (about 1.37 mol/L) was poured on the outer (shell) side surface 105. After about 2 hours of bore solution flow, the pump was stopped for about 3.5 hours to provide a static growth step. After about 3.5 hours, the pump was continued for about 20 minutes. After about 20 minutes, the pump was stopped for another 3.5 hours to provide another static growth step. The reaction was stopped after about 9 hours and the hollow fiber 100 was rinsed with deionized water (DI) and methanol.

Second, a $Zn^{+2}$/1-octanol solution containing about 0.022 g Zinc nitrate hexahydrate ($Zn^{+2}$) in about 40 mL 1-octanol (about 0.018 mol/L) was flowed through the bore 110 at about 10 μL/hour while a mIm/1-octanol solution containing about 9 g mIm in about 80 mL 1-octanol (about 1.37 mol/L) was poured on the outer (shell) side surface 105. After about 2 hours of bore solution flow, the pump was stopped for about 3.5 hours to provide a static growth step. After about 3.5 hours, the pump was continued for about 20 minutes. After about 20 minutes, the pump was stopped for another 3.5 hours to provide another static growth step. The reaction was stopped after about 9 hours and the hollow fiber 100 was rinsed with 1-octanol, deionized water (DI), heptanes and methanol.

Third, a $Zn^{+2}$/1-octanol solution containing about 0.11 g Zinc nitrate hexahydrate ($Zn^{+2}$) in about 40 mL 1-octanol (about 0.018 mol/L) was flowed through the bore 110 at about 10 μL/hour while an aqueous mIm solution containing about 9 g mIm in about 80 mL deionized water (DI) (about 1.37 mol/L) was poured on the outer (shell) side surface 105. After about 2 hours of bore solution flow, the pump was stopped for about 3.5 hours to provide a static growth step. After about 3.5 hours, the pump was continued for about 20 minutes. After about 20 minutes, the pump was stopped for another 3.5 hours to provide another static growth step. The reaction was stopped after about 9 hours and the hollow fiber 100 was rinsed with 1-octanol, deionized water (DI), heptanes and methanol.

Figure 18A:
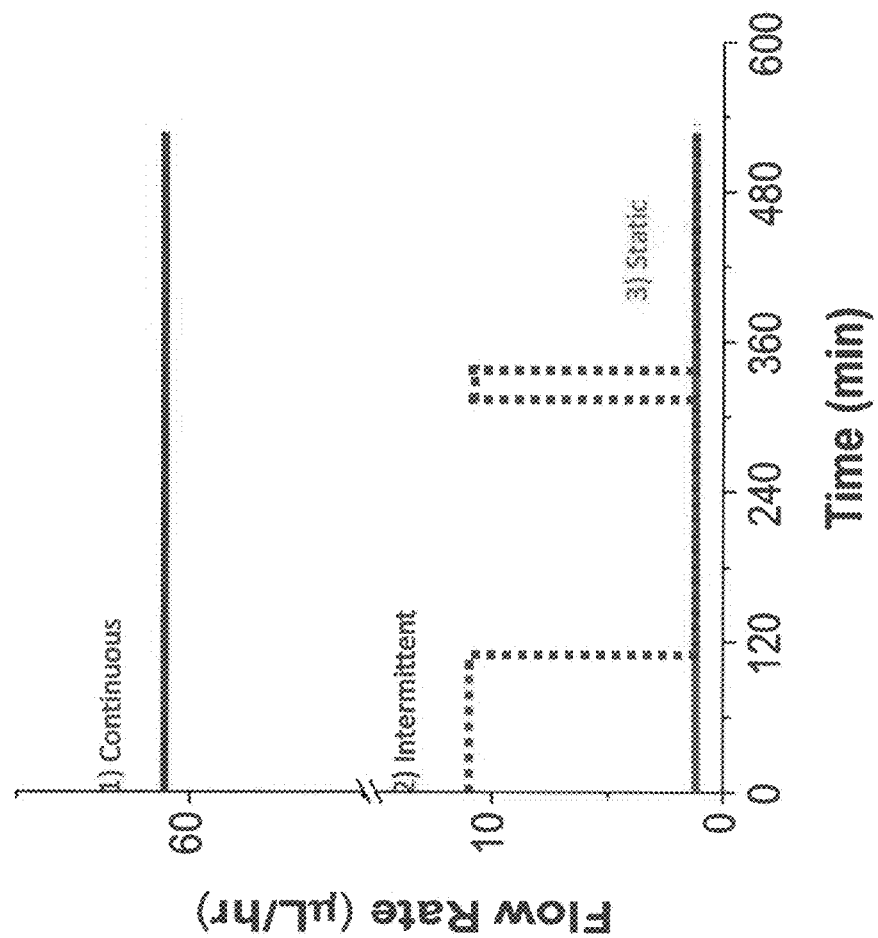
FIG. 18A illustrates a chart of Time (minutes) vs. Flow Rate (4/hour), showing static, continuous and intermittent flow conditions used to synthesize ZIF-8 membranes on the inner (bore) side surface of a polyamide-imide (e.g., TORLON®) hollow fibers as in Example 1.

A chart of Time vs. Flow Rate summarizing the examined static, continuous and pulsed flow conditions through the bore 110 of the hollow fiber 100 is illustrated in FIG. 18A.

Figure 18C:
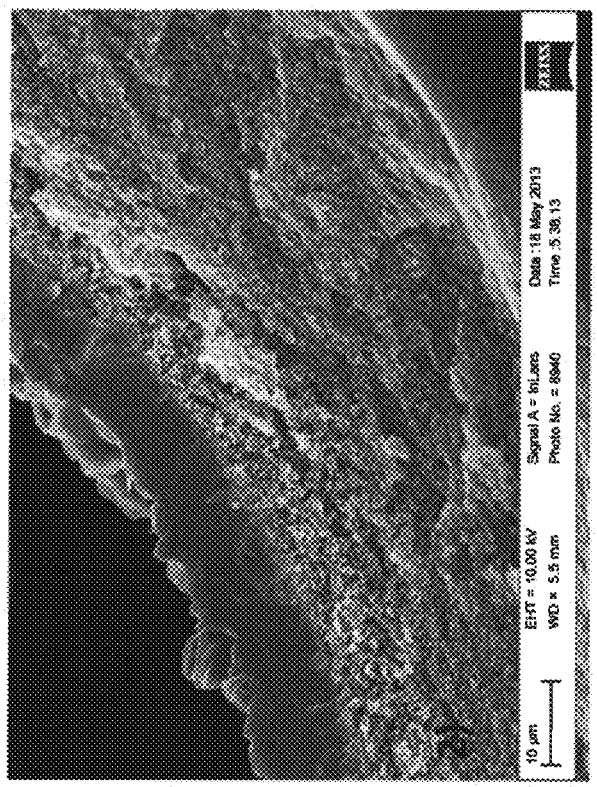
FIG. 18C illustrates a cross-sectional view of a SEM micrograph of a ZIF-8 membrane grown in a polyamide-imide (e.g., TORLON®) hollow fiber using the IMMP approach with a continuous flow of a $Zn^{+2}$/1-octanol bore solution, depicting a continuous ZIF-8 membrane (~3 μm thick) on the inner (bore) side surface of the hollow fiber.
Figure 18B:
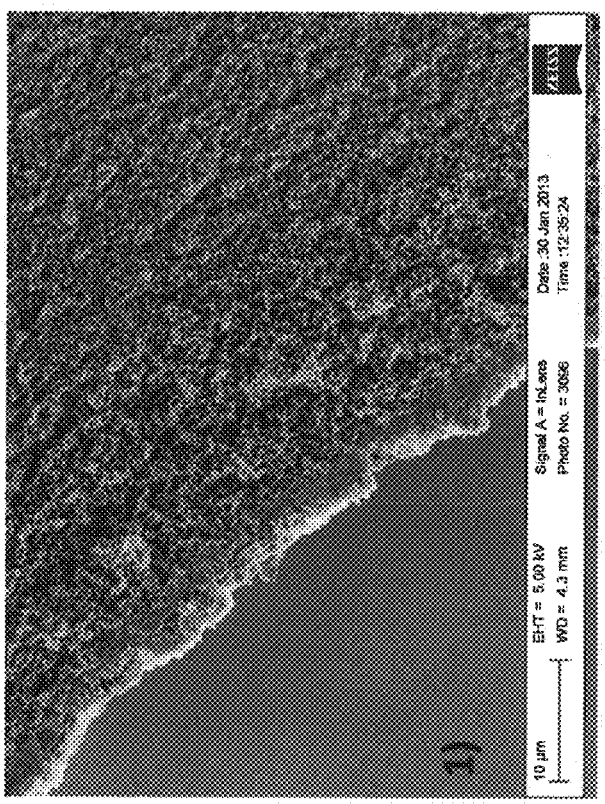
FIG. 18B illustrates a cross-sectional view of a SEM micrograph of a ZIF-8 membrane grown in a polyamide-imide (e.g., TORLON®) hollow fiber using the IMMP approach with a static flow of a $Zn^{+2}$/1-octanol bore solution, depicting a discontinuous particle coating on the inner (bore) side surface of the hollow fiber.

A cross-sectional view of a SEM micrograph of a ZIF-8 membrane grown in a polyamide-imide (e.g., TORLON®) hollow fiber with a static flow of a $Zn^{+2}$/1-octanol bore solution is illustrated in FIG. 18B. As shown in FIG. 18B, static growth conditions produce dense, non-continuous coatings of ZIF-8 particles in the inner (bore) side surface 110 of the hollow fiber 100. This is due to the lack of sufficient $Zn^{2+}$ ions available in the microscale bore of the hollow fiber 100 to sustain the film growth after the initial nucleation and growth of ZIF-8 crystals at the inner (bore) side surface 110 of the hollow fiber 100.

Figure 15:
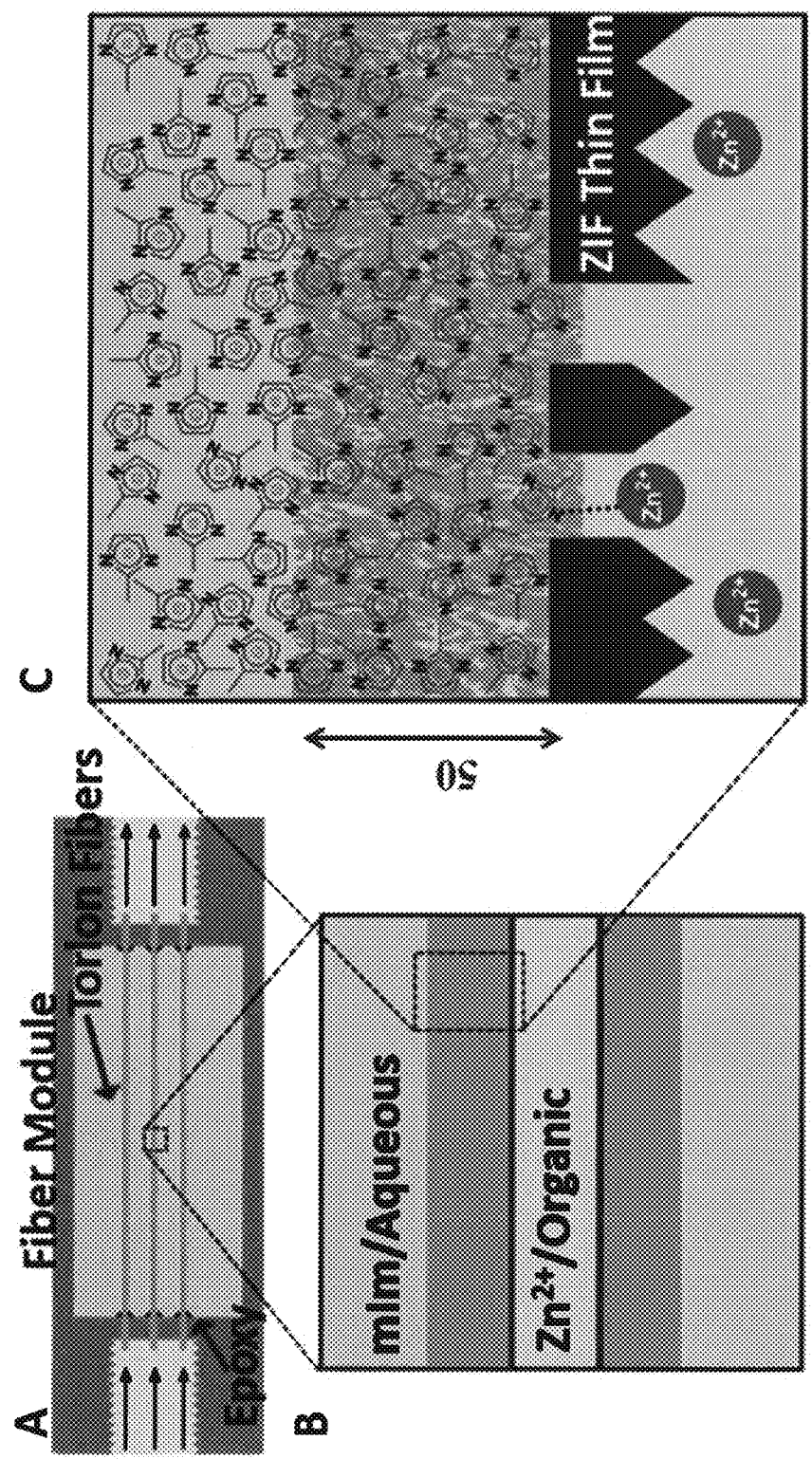
FIG. 15 illustrates a schematic of the IMMP approach: (A) depicts a side view of a plurality of hollow fibers (orange) mounted in a reactor cell, (B) depicts an exploded side view of hollow fiber support during synthesis, showing $Zn^{2+}$ ions being supplied by a 1-octanol solution (light red) flowing through the bore of the hollow fiber and methylimidazole linkers being supplied on the outer (shell) side of the hollow fiber in an aqueous solution (light blue), and (C) depicts a further exploded view of hollow fiber support during synthesis, showing the membrane forming on the inner surface of the hollow fiber by reaction of the two precursors to form a polycrystalline ZIF-8 layer (dark blue)

A cross-sectional view of a SEM micrograph of a ZIF-8 membrane grown on a polyamide-imide (e.g., TORLON®) hollow fiber with continuous flow of a $Zn^{+2}$/1-octanol bore solution is illustrated in FIG. 18B. As shown in FIG. 18C, continuous flow growth conditions produced a thin, continuous membrane (about 3 μm thickness) that was formed in the inner (bore) side surface 110 of the hollow fiber 100. This is due to the relatively rapid transport of reactants to the interface under continuous flow, leading to rapid formation and closure of the ZIF-8 layer. The growing membrane itself becomes a barrier between the two immiscible solvents, and confines the liquid-liquid interface into the gaps and interstices between the ZIF-8 crystals. See FIG. 15.

Figure 18D:
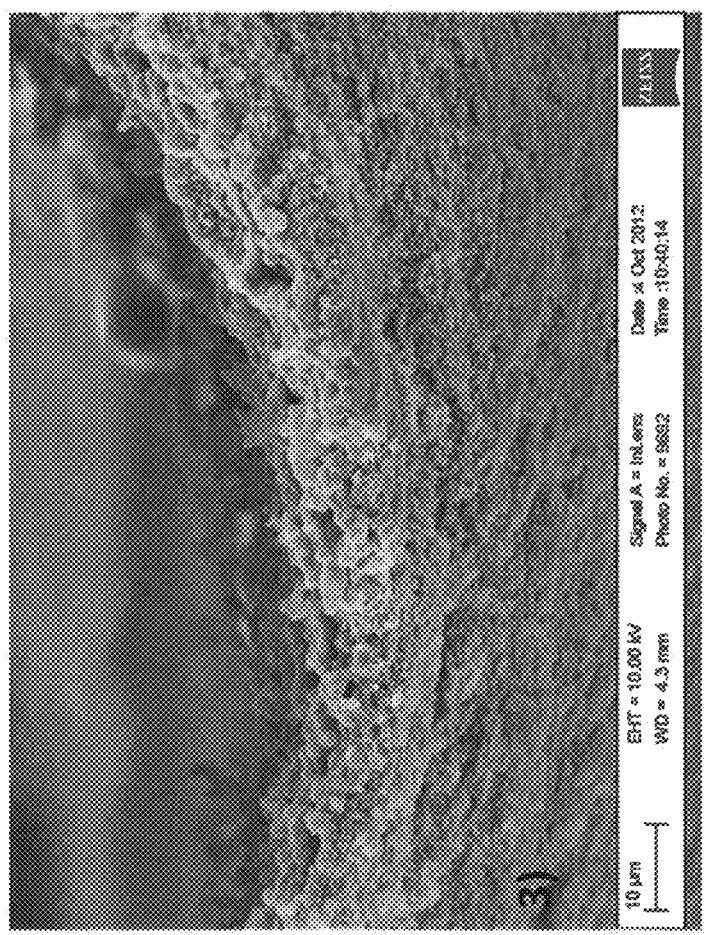
FIG. 18D illustrates a cross-sectional view of a SEM micrograph of a ZIF-8 membrane grown in a polyamide-imide (e.g., TORLON®) hollow fiber using the IMMP approach with an intermittent flow of a $Zn^{+2}$/1-octanol bore solution, depicting a continuous ZIF-8 membrane (~8 µm thick) on the inner (bore) side surface of the hollow fiber.

A cross-sectional view of a SEM micrograph of a ZIF-8 membrane grown on a polyamide-imide (e.g., TORLON®) hollow fiber with intermittent flow of a $Zn^{+2}$/1-octanol bore solution is illustrated in FIG. 18D. As shown in FIG. 18D, intermittent flow growth conditions produced a thicker, continuous membrane (about 8 μm thickness) that was formed in the inner (bore) side surface 110 of the hollow fiber 100. The flow profile included an initial continuous growth step, followed by a static growth step interrupted by a brief reactant replenishment step. In an embodiment, the flow profile included an initial continuous growth step of about 10 μL/hour of a $Zn^{+2}$/1-octanol bore solution for about 2 hours, followed by a static growth step of about 0 μL/hour of the bore solution for about 3.5 hours, followed by a replenishment step of about 10 μL/hour of bore solution for about 20 minutes and followed by another static growth step of about 0 μL/hour of bore solution for about 3.5 hours. See FIG. 18A: flow profile 2.

Figure 17B:
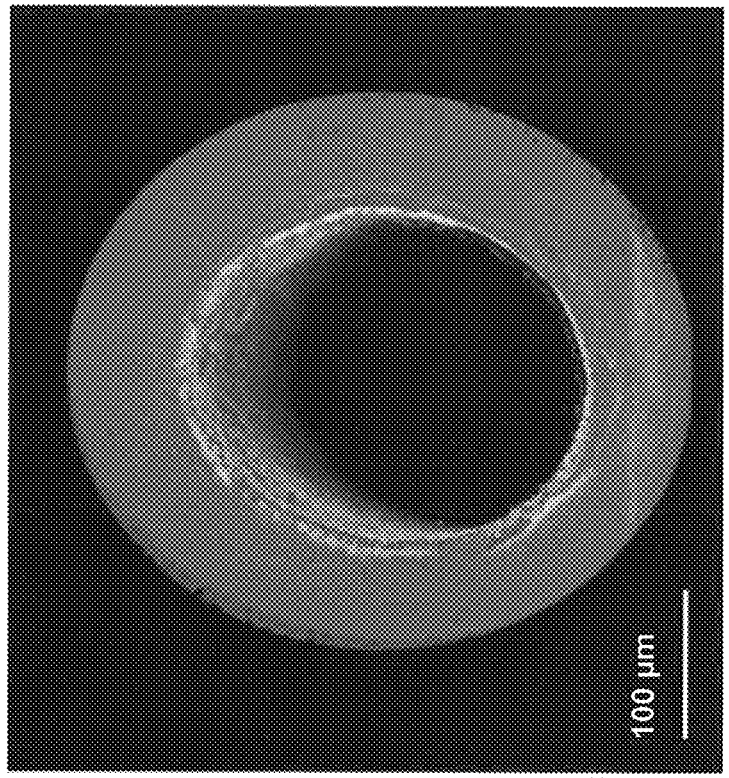
FIG. 17B illustrates an EDS elemental maps of carbon (red) and superimposed zinc (green) showing the localization of the ZIF-8 membrane on the inner (bore) side surface of the polyamide-imide (e.g., TORLON®) hollow fiber as in Example 1.
Figure 17A:
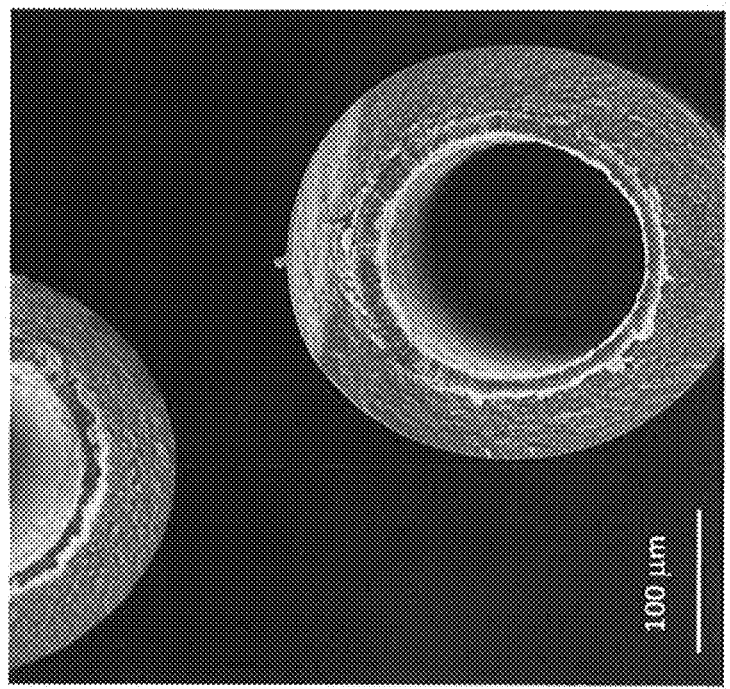
FIG. 17A illustrates a cross-sectional view of a SEM micrograph of a ZIF-8 membrane grown in polyamide-imide (e.g., TORLON®) hollow fiber on the inner (bore) side surface by manipulating the location of the two reactants (i.e., zinc nitrate hexahydrate and mIm) and the two solvents (i.e., deionized water (DI) and 1-octanol) as in Example 1.
Figure 19:
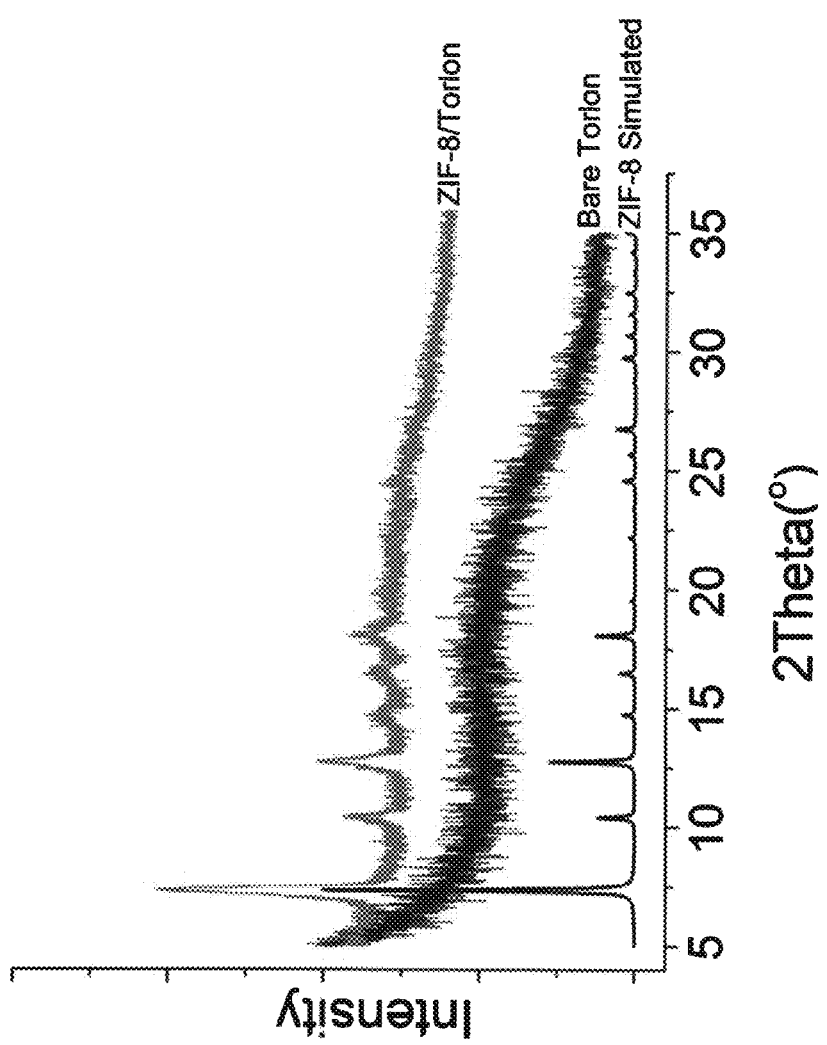
FIG. 19 illustrates an XRD pattern confirming crystal structure of ZIF-8 membrane grown on a polyamide-imide (e.g., TORLON®) hollow fiber using the IMMP approach with intermittent flow of a $Zn^{+2}$/1-octanol bore solution as in Example 1.
Figures 20A, 20B:
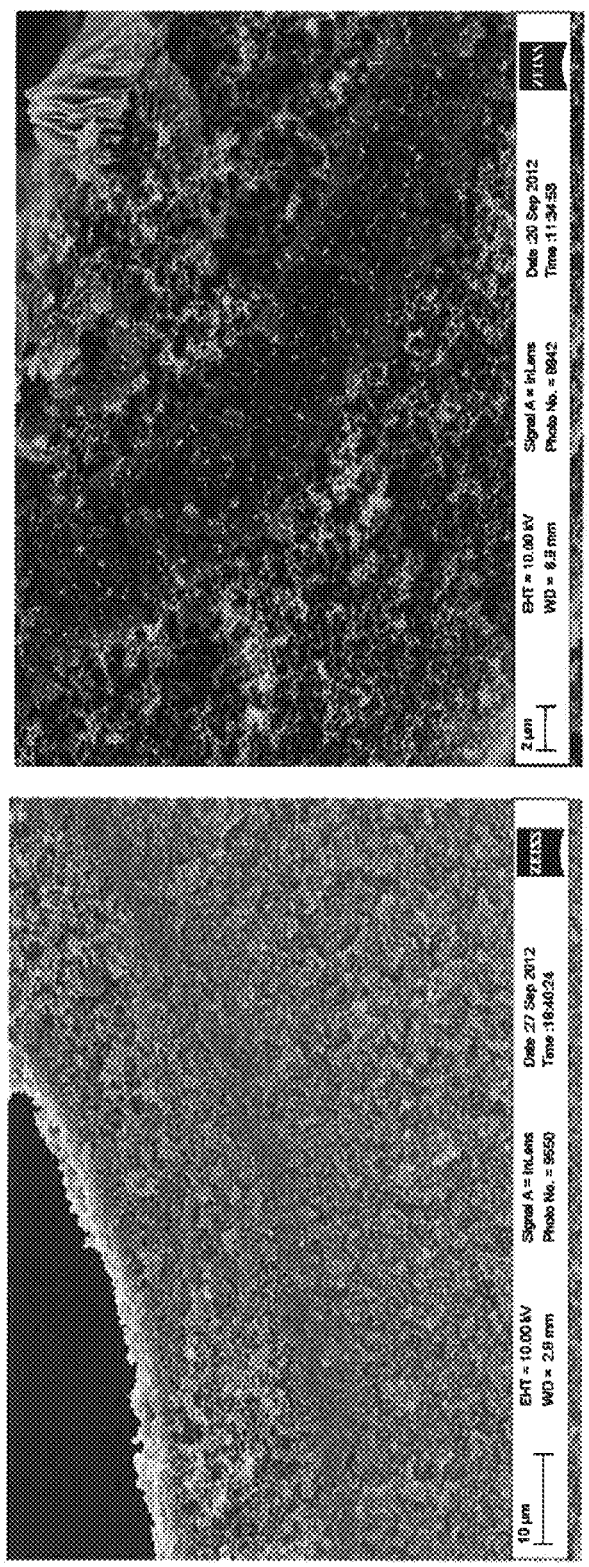
FIG. 20A illustrates a cross-sectional view of a SEM micrograph of a ZIF-8 membrane grown in a polyamide-imide (e.g., TORLON®) hollow fiber closer to an inner (bore) side surface by manipulating the location of the two reactants (i.e., zinc nitrate hexahydrate and mIm) and the two solvents (i.e., DI and 1-octanol) as in Example 2.
FIG. 20B illustrates a cross-sectional view of a SEM micrograph of a ZIF-8 membrane grown in a polyamide-imide (e.g., TORLON®) hollow fiber closer to an inner (bore) side surface by manipulating the location of the two reactants (i.e., zinc nitrate hexahydrate and mIm) and the two solvents (i.e., DI and 1-octanol) as in Example 3.
Figure 20D:
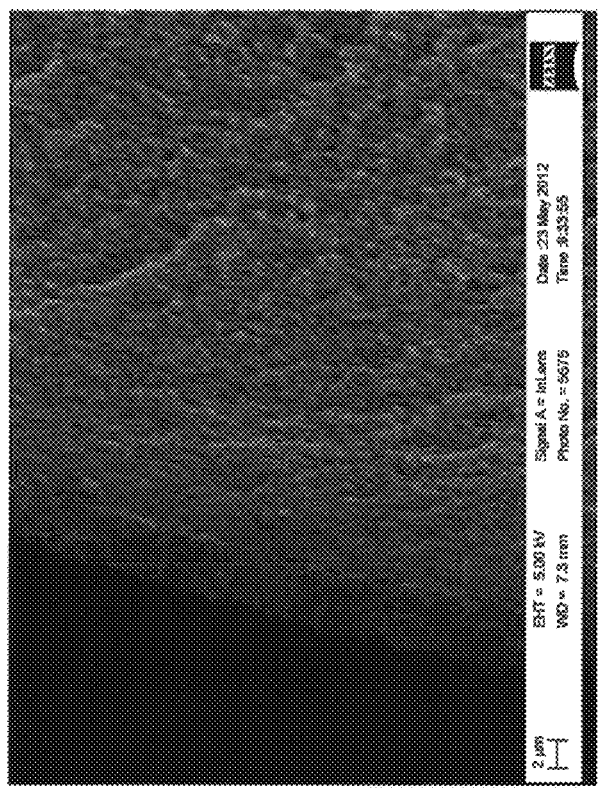
FIG. 20D illustrates a cross-sectional view of a SEM micrograph of a ZIF-8 membrane grown in a polyamide-imide (e.g., TORLON®) hollow fiber closer to an outer (shell) side surface by manipulating the location of the two reactants (i.e., zinc nitrate hexahydrate and mIm) and the two solvents (i.e., DI and 1-octanol) as in Example 5.
Figure 20C:
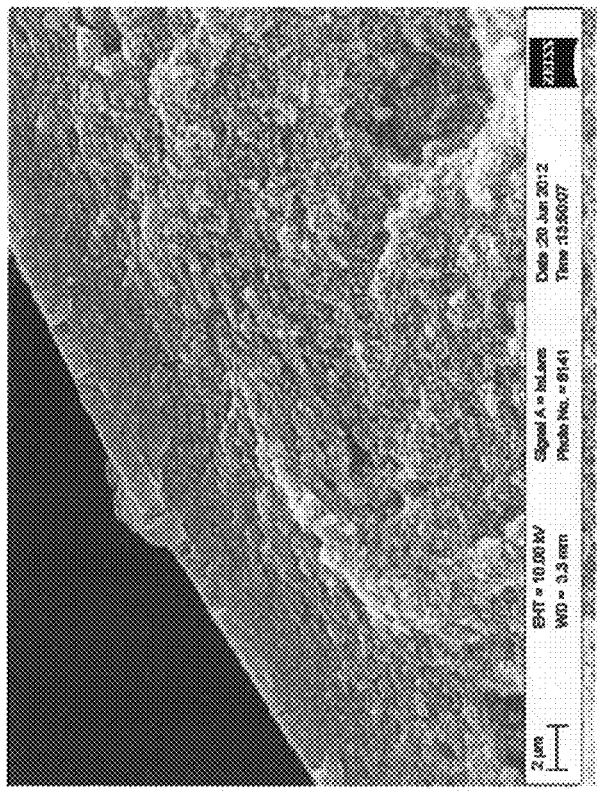
FIG. 20C illustrates a cross-sectional view of a SEM micrograph of a ZIF-8 membrane grown in a polyamide-imide (e.g., TORLON®) hollow fiber closer to an outer (shell) side surface by manipulating the location of the two reactants (i.e., zinc nitrate hexahydrate and mIm) and the two solvents (i.e., DI and 1-octanol) as in Example 4.
Figure 21A:
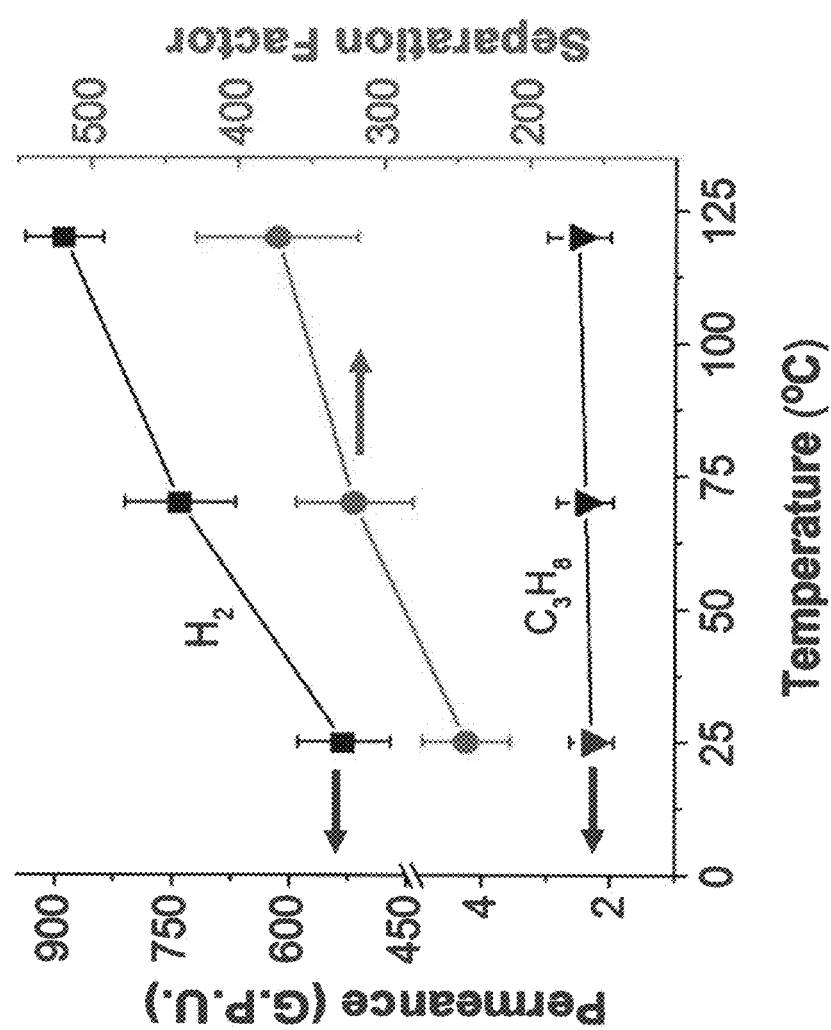
FIG. 21A illustrates a chart of Temperature (° C.) vs. Permeance (G.P.U.) and Separation Factor, showing binary $H_2/C_3H_8$ permeation characteristics for equimolar feed mixtures on a ZIF-8 membrane grown in a polyamide-imide (e.g., TORLON®) hollow fiber using the IMMP system and capping ends of the hollow fiber with poly(dimethylsiloxane) (PDMS)
Figure 21B:
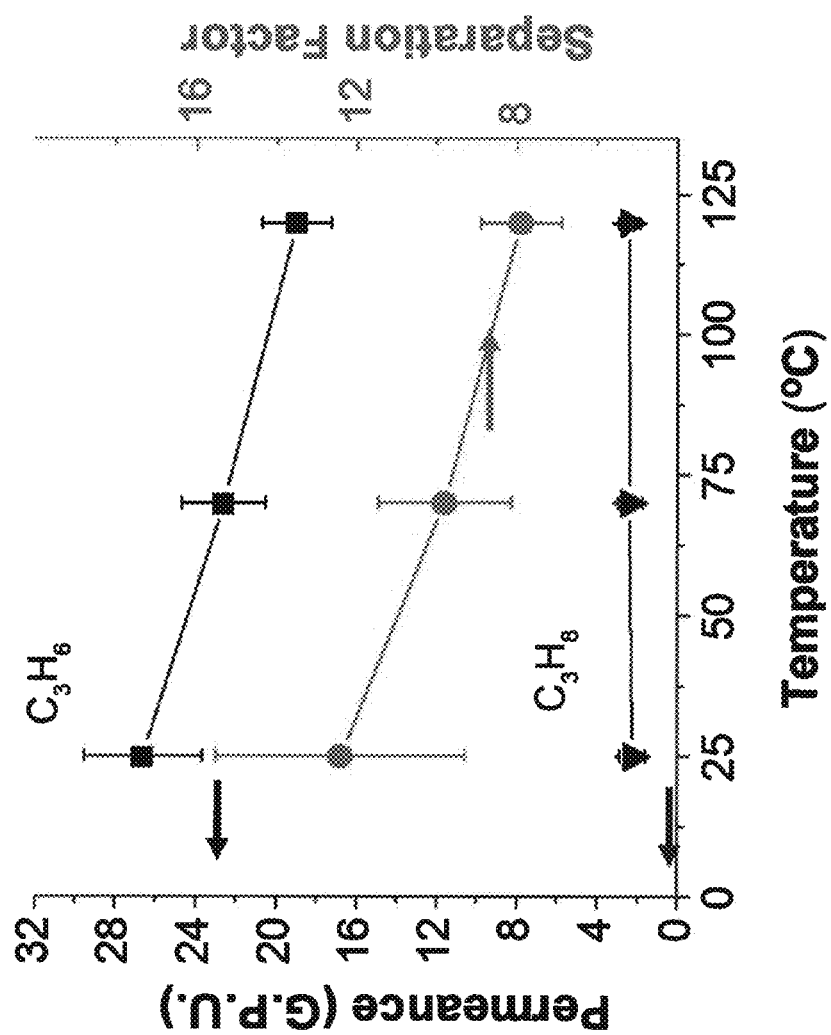
FIG. 21B illustrates a chart of Temperature (° C.) vs. Permeance (G.P.U.) and Separation Factor, showing binary $C_3H_6/C_3H_8$ permeation characteristics for equimolar feed mixtures on a ZIF-8 membrane grown in a polyamide-imide (e.g., TORLON®) hollow fiber using the IMMP system and capping ends of the hollow fiber with PDMS.
Figure 22A:
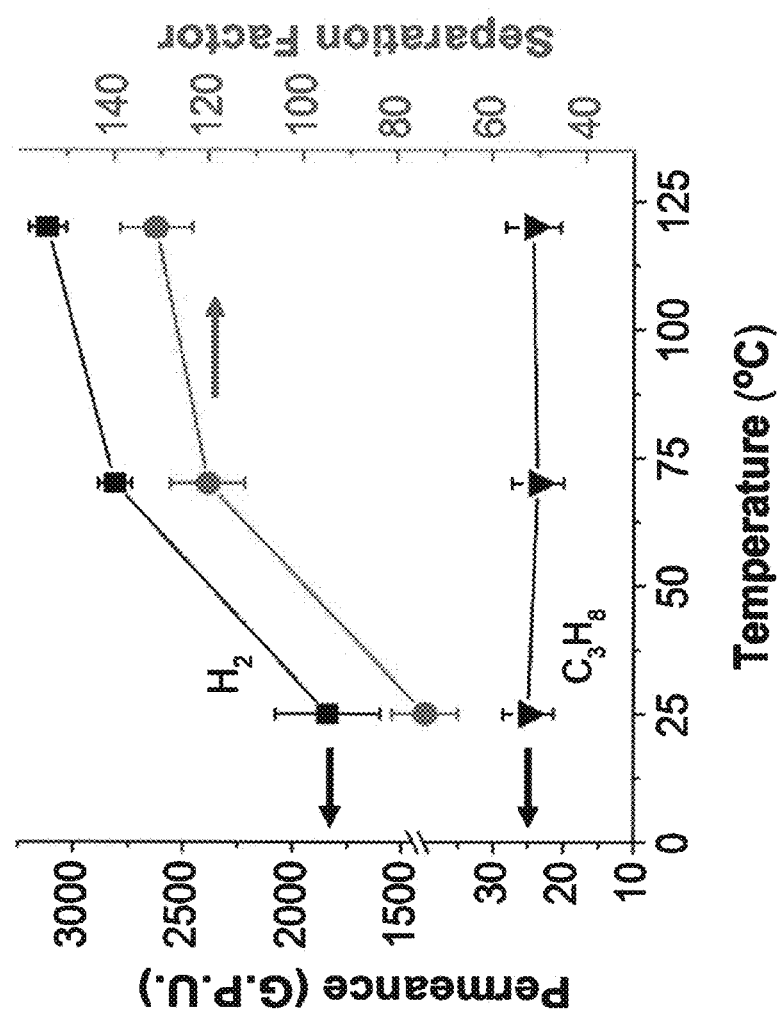
FIG. 22A illustrates a chart of Temperature (° C.) vs. Permeance (G.P.U.) and Separation Factor, showing binary permeation characteristics for an equimolar $H_2/C_3H_8$ feed mixture on a ZIF-8 membrane grown in polyamide-imide (e.g., TORLON®) hollow fiber using the IMMP system.
Figure 22B:
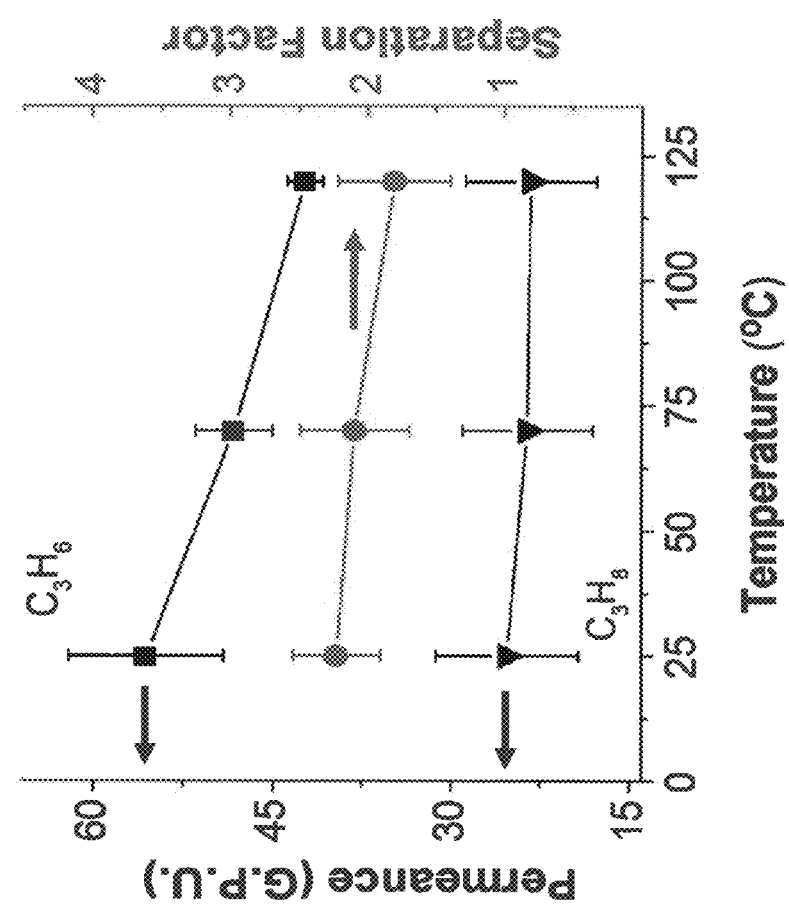
FIG. 22B illustrates a chart of Temperature (° C.) vs. Permeance (G.P.U.) and Separation Factor, showing binary permeation characteristics for an equimolar $C_3H_6/C_3H_8$ feed mixture on a ZIF-8 membrane grown in polyamide-imide (e.g., TORLON®) hollow fiber using the IMMP system.

Additionally, FIG. 17A shows lower-magnification images of ZIF-8 membranes formed on two hollow fibers 100; and FIG. 17B shows the zinc elemental mapping, confirming the localization of the membrane to the inner (bore) side surface 110 of the hollow fiber 100. X-ray diffraction confirmed the ZIF-8 crystal structure of the film. See FIG. 19.

Performance in Membrane Synthesis: Pulsed Flow Synthesis

Table 2 shows measurement of gas and liquid permeation properties for various supported ZIF-8 membranes.

TABLE 2

Measurement of Gas and Liquid Permeation Properties

| Reference | Support | Thickness (μm) | Permeance (GPU) | | | | | | |
|---|---|---|---|---|---|---|---|---|---|
| | | | $H_2$ | $CO_2$ | $CH_4$ | $C_3H_8$ | $C_6H_{14}$ | $C_6H_{12}$ | $C_6H_6$ |
| Y. Pan | YSZ Tube | 2.5 | 4400 | 1200 | 360 | 4 | | | |
| Y. Pan | $Al_2O_3$ Disk | 2.5 | 1100 | 390 | 240 | 2 | | | |
| AJB | Torlon ® | 8 | 2900 | 500 | 270 | 60 | 2600 | 600 | 290 |

Figure 14:
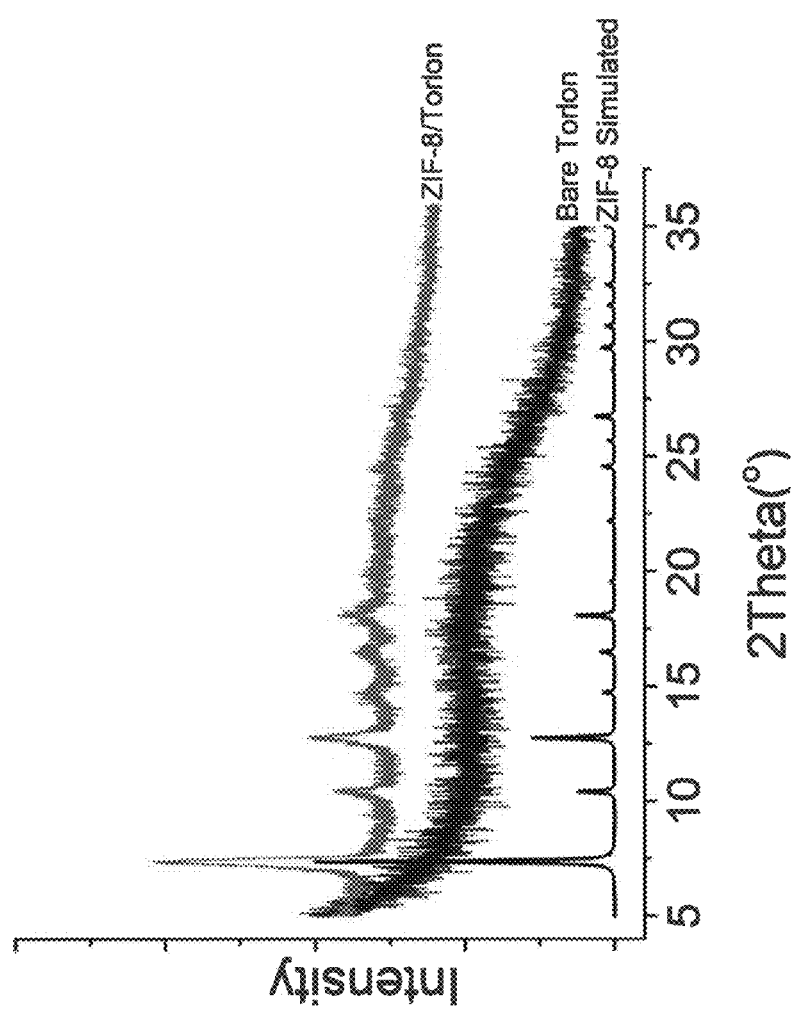
FIG. 14 illustrates a X-ray Diffraction (XRD) chart of 2Theta (°) vs. Intensity for simulated and experimental ZIF-8 membranes on polyamide-imide (e.g., TORLON®) hollow fiber, confirming formation and structure of supported ZIF-8 membranes on inner (bore) side surface of hollow fiber.

A X-ray Diffraction (XRD) chart of 2Theta (°) vs. intensity for simulated and experimental ZIF-8 membranes and polyamide-imide (e.g., TORLON®) hollow fiber, confirming formation and structure of supported ZIF-8 membranes on the bore 110 of the hollow fiber 100 is shown in FIG. 14.

Performance in Membrane Synthesis: Pulsed Flow and Stirred Synthesis

Table 3 shows the single-component gas permeation properties of a ZIF-8 membrane measured in situ using the reactor module 400 and gently stirring the outer (shell) side 105 solution.

TABLE 3

Measurement of Single-Component Gas Permeation Properties for grown ZIF-8 Membrane

| Sample | Support | Flow Rate | Thickness (μm) | Permeance (GPU) | | | Selectivity |
|---|---|---|---|---|---|---|---|
| | | | | $H_2$ | $CH_4$ | $C_3H_8$ | $H_2/C_3H_8$ |
| ZIF-8_10 μL/hour Pulsed | Torlon ® | 10 μL/hour | 8 | 4200 | 400 | 35 | 120 |

Table 4 shows measurement of gas permeation properties of a ZIF-8 membrane when the mixture feed consisted of a 1:1 $H_2/C_3H_8$ mixture.

TABLE 4

Measurement of Mixed Gas Permeation Properties

| Sample | Support | Thickness (μm) | Permeance (GPU) | | Selectivity |
|---|---|---|---|---|---|
| | | | $H_2$ | $C_3H_8$ | $H_2/C_3H_8$ |
| Y. Pan | YSZ Tube | 2.5 | 2000 | 4 | 470 |
| ZIF-8_10 10 μL/hour | Torlon ® | 8 | 2250 | 26.4 | 85 |

Y. Pan, et al., J. MEMBR. SCI. 421 (2012) 292.

Pulsed-Flow Synthesis of ZIF-8 Membranes

Using a macroporous polyamide-imide (e.g., TORLON®) hollow fiber and the material ZIF-8 as an archetype for a hollow fiber or tubular membrane synthesis, a series of pulsed flow membrane synthesis experiments were performed. Table 5 shows combinations of precursor solutions and locations (bore/shell) tested to synthesize ZIF-8 membranes using a reactor module 400. Several examples of ZIF-8 membrane fabrication using the reactor module 400 are described below, and their results are shown in the SEM micrographs of FIGS. 17A-17B, 18A-18D and 20A-20D. For the experiments, a temperature probe 490 set at 30° C. was inserted into the reactor module 400 during membrane growth.

TABLE 5

Combinations of Precursor Solutions Tested to Synthesize ZIF-8 Membranes Using IMMP Approach

| Example | Bore Solution | Shell Solution | Molar Ratio $Zn^{+2}$/mIm | Membrane Location |
|---|---|---|---|---|
| 1 (see FIGS. 17A-17B and 18A-18D) | 0.018 mol/L $Zn^{+2}$ in 1-octanol | 1.37 mol/L mIm in DI | 75 | Bore (inner surface) |

TABLE 5-continued

Combinations of Precursor Solutions Tested to Synthesize
ZIF-8 Membranes Using IMMP Approach

| Example | Bore Solution | Shell Solution | Molar Ratio $Zn^{+2}$/mIm | Membrane Location |
|---|---|---|---|---|
| 2 (see FIG. 20A) | 0.018 mol/L $Zn^{+2}$ in 1-octanol | 1.37 mol/L mIm in DI | 75 | In fiber, closer to bore surface |
| 3 (see FIG. 20B) | 0.018 mol/L $Zn^{+2}$ in 1-octanol | 1.37 mol/L mIm in DI | 75 | In fiber, closer to bore surface |
| 4 (see FIG. 20C) | 1.37 mol/L mIm in DI | 0.018 mol/L $Zn^{+2}$ in 1-octanol | 75 | Shell (outer surface) |
| 5 (see FIG. 20D) | 1.37 mol/L mIm in DI | 0.018 mol/L $Zn^{+2}$ in 1-octanol | 75 | Shell (outer surface) |

Example 1

First, about 10 mL of neat 1-octanol solvent was flowed through a bore 110 using a syringe pump.

Second, about 3 mL of a $Zn^{+2}$/1-octanol solution containing 0.11 g Zinc nitrate hexahydrate ($Zn^{+2}$) in about 40 mL 1-octanol (about 0.018 mol/L) was flowed through the bore 110 of a horizontal hollow fiber 100 at a flow rate of about 10 μL/hour. In an embodiment, a limited $Zn^{+2}$/1-octanol solution containing about 0.005 mol/L to about 0.1 mol/L $Zn^{+2}$ in 1-octanol may be used. In an embodiment, a limited $Zn^{+2}$/1-octanol solution containing about 0.01 mol/L to about 0.03 mol/L $Zn^{+2}$ in 1-octanol may be used. Increasing the $Zn^{+2}$ concentration to about 0.03 mol/L leads to reduction of the membrane thickness and increase in crystal nucleation.

About 70 mL of an aqueous mIm solution containing about 9 g mIm in about 80 mL dionized water (DI) (about 1.37 mol/L) was slowly poured into the reactor module 400, immersing the outer (shell) side surface 105 of the hollow fiber 100. In an embodiment, an excess aqueous mIm solution containing about 0.5 mol/L to about 10 mol/L mIm in deionized water (DI) may be used, provided that the mIm concentration is in excess. In an embodiment, an excess aqueous mIm solution containing about 1.2 mol/L to about 1.6 mol/L mIm in deionized water (DI) may be used.

The aqueous mIm (shell) solution was gently stirred at about 60 rpm to prevent the formation of local concentration gradients. In an embodiment, the aqueous mIm solution may be stirred at about 40 rpm to about 80 rpm.

After about 2 hours of bore solution flow, the pump was stopped for about 3.5 hours to provide a static growth step. After about 3.5 hours, the pump was continued for about 20 minutes. After about 20 minutes, the pump was stopped for another 3.5 hours to provide another static growth step. In an embodiment, the bore solution flows at a first flow rate for a first period, the bore solution is stopped for a second period, the bore solution flows at a second flow rate for a third period and the bore solution is stopped for a fourth period. In an embodiment, the first and second flow rate is about 10 μL/hour to about 100 μL/hour. In an embodiment, the first period is about 1 hour to about 3 hours, the second period is about 3 hours to about 4 hours, the third period is about 10 minutes to about 30 minutes and the fourth period is about 3 hours to about 4 hours.

To stop the reaction, about 10 mL of neat 1-octanol solvent was pushed through the bore 110 while the outer (shell) side surface 105 was soaked in about 70 mL of neat DI (and replaced three times) to remove the excess $Zn^{+2}$. Next, about 10 mL heptanes were pushed through the bore 110 while the outer (shell) side surface 105 was soaked in about 70 mL heptanes to remove the 1-octanol. Next, about 10 mL of hexane was pushed through the bore 110 while the outer (shell) side surface 105 was soaked in hexane to remove the heptanes. Then, about 20 mL methanol was flowed through the bore 110 while the outer (shell) side surface 105 was soaked in about 70 mL methanol to remove the DI. The reactor module 400 was allowed to air dry at least 4 days before permeation testing.

Example 2

First, about 10 mL DI was first flowed through the bore 110 followed by about 3 mL of an aqueous $Zn^{+2}$ (bore) solution (about 0.018 mol/L). About 70 mL of an aqueous mIm solution (about 1.37 mol/L) was added to the outer (shell) side surface 105 (i.e., slowly poured into the reactor module 400 and was gently stirred at about 60 rpm to prevent the formation of local concentration gradients) while the aqueous $Zn^{+2}$ (bore) solution was flowed at about 10 μL/hour for about 2 hours. After about 2 hours of bore solution flow, the pump was stopped for about 3.5 hours to provide a static growth step. After about 3.5 hours, the pump was continued for about 20 minutes. After about 20 minutes, the pump was stopped for another 3.5 hours to provide another static growth step.

To stop the reaction, about 20 mL DI was flowed through the bore 110 while the outer (shell) side surface 105 was soaked in about 70 mL of neat DI (and replaced three times) to remove the excess $Zn^{+2}$. Then, about 20 mL methanol was flowed through the bore 110 while the outer (shell) side surface 105 was soaked in about 70 mL methanol to remove the DI. The reactor cell 400 was allowed to air dry at least 4 days before permeation testing.

Example 3

First, about 10 mL 1-octanol was first flowed through the bore 110 followed by about 3 mL of a $Zn^{+2}$/1-octanol (bore) solution (about 0.018 mol/L). About 70 mL of an mIm/1-octanol solution (about 1.37 mol/L) was added to the outer (shell) side surface 105 while the $Zn^{+2}$/1-octanol (bore) solution was flowed at about 10 μL/hour for about 2 hours. After about 2 hours of bore solution flow, the pump was stopped for about 3.5 hours to provide a static growth step. After about 3.5 hours, the pump was continued for about 20 minutes. After about 20 minutes, the pump was stopped for another 3.5 hours to provide another static growth step.

To stop the reaction, about 10 mL neat 1-octanol solvent was pushed through the bore 110 while the outer (shell) side surface 105 was soaked in about 70 mL of neat 1-octanol solvent. Then, about 10 mL of heptanes were pushed through the bore 110 while the outer (shell) side surface 105 was soaked in about 70 mL of heptanes to remove the 1-octanol. Then, about 10 mL of hexane was pushed through the bore 110 while the outer (shell) side surface 105 was soaked in about 70 mL of hexane to remove the heptanes. Then, about 10 mL of methanol was pushed through the bore 110 while the outer (shell) side surface 105 was soaked in about 70 mL of methanol. The reactor module 400 was allowed to air dry at least 4 days before permeation testing.

Example 4

First, about 10 mL neat 1-octanol solvent was flowed through the bore 110 followed by about 3 mL of mIm/1-octanol (bore) solution (about 1.37 mol/L).

Second, About 70 mL of an aqueous $Zn^{+2}$ solution (about 0.018 mol/L) was added to the outer (shell) side surface 105 while the mIm/octanol (bore) solution was flowed at about 10 μL/hour for about 2 hours. After about 2 hours of bore solution flow, the pump was stopped for about 3.5 hours to provide a static growth step. After about 3.5 hours, the pump was continued for about 20 minutes. After about 20 minutes, the pump was stopped for another 3.5 hours to provide another static growth step.

To stop the reaction, about 10 mL of neat 1-octanol solvent was pushed through the bore 110 while the outer (shell) side surface 105 was soaked in about 70 mL of neat DI (and replaced three times) to remove the excess $Zn^{+2}$. Next, about 10 mL heptanes were pushed through the bore 110 while the outer (shell) side surface 105 was soaked in about 70 mL heptanes to remove the 1-octanol. Next, about 10 mL of hexane was pushed through the bore 110 while the outer (shell) side surface 105 was soaked in hexane to remove the heptanes. Then, about 20 mL methanol was flowed through the bore 110 while the outer (shell) side surface 105 was soaked in about 70 mL methanol to remove the DI. The reactor module 400 was allowed to air dry at least 4 days before permeation testing.

Example 5

First, about 10 mL DI was flowed through the bore 110 followed by about 3 mL of an aqueous mIm solution (about 1.37 mol/L).

Second, about 70 mL of a $Zn^{+2}$/1-octanol solution (about 0.018 mol/L) was added to the outer (shell) side surface 105 while the aqueous mIm (bore) solution was flowed at about 10 μL/hour for about 2 hours. After about 2 hours of bore solution flow, the pump was stopped for about 3.5 hours to provide a static growth step. After about 3.5 hours, the pump was continued for about 20 minutes. After about 20 minutes, the pump was stopped for another 3.5 hours to provide another static growth step.

The reaction was stopped by flowing about 20 mL DI through the bore 110 and exchanging the outer (shell) side surface 105 solution with neat 1-octanol solvent. Then, about 10 mL heptanes were flowed through the bore 110 while the outer (shell) side surface 105 was soaked in about 70 mL of heptanes. Then, about 10 mL hexane was flowed through the bore 110 while the outer (shell) side surface 105 was soaked in about 70 mL of hexane. Then, about 20 mL methanol was flowed through the bore 110 while the outer (shell) side surface 105 was soaked in about 70 mL of methanol.

Capping of Hollow Fiber Ends

A capping solution containing poly(dimethylsiloxane) (PDMS) (e.g., SYLGARD® 184 (Corning)) in a solvent may be used as a filler material to cap both ends of the hollow fiber 100. In an embodiment, a capping solution containing about 9 wt % PDMS in heptane was heated at about 90° C. with vigorous stirring for about 4 hours to thermally crosslink the PDMS. In an embodiment, a capping solution of about 8 wt % to 10 wt % PDMS in heptane may be used.

After cooling to about 25° C., about 2 μL droplet was applied from a pipette to each hollow fiber 100 end. Immediately upon applying the sealing solution, Argon gas was immediately flowed through the inner (bore) side 110 and followed by curing at about 120° C. for about 2 hours.

Performance of ZIF-8 Membranes Made Using IMMP Reactor Cell/Module

Figure 16:
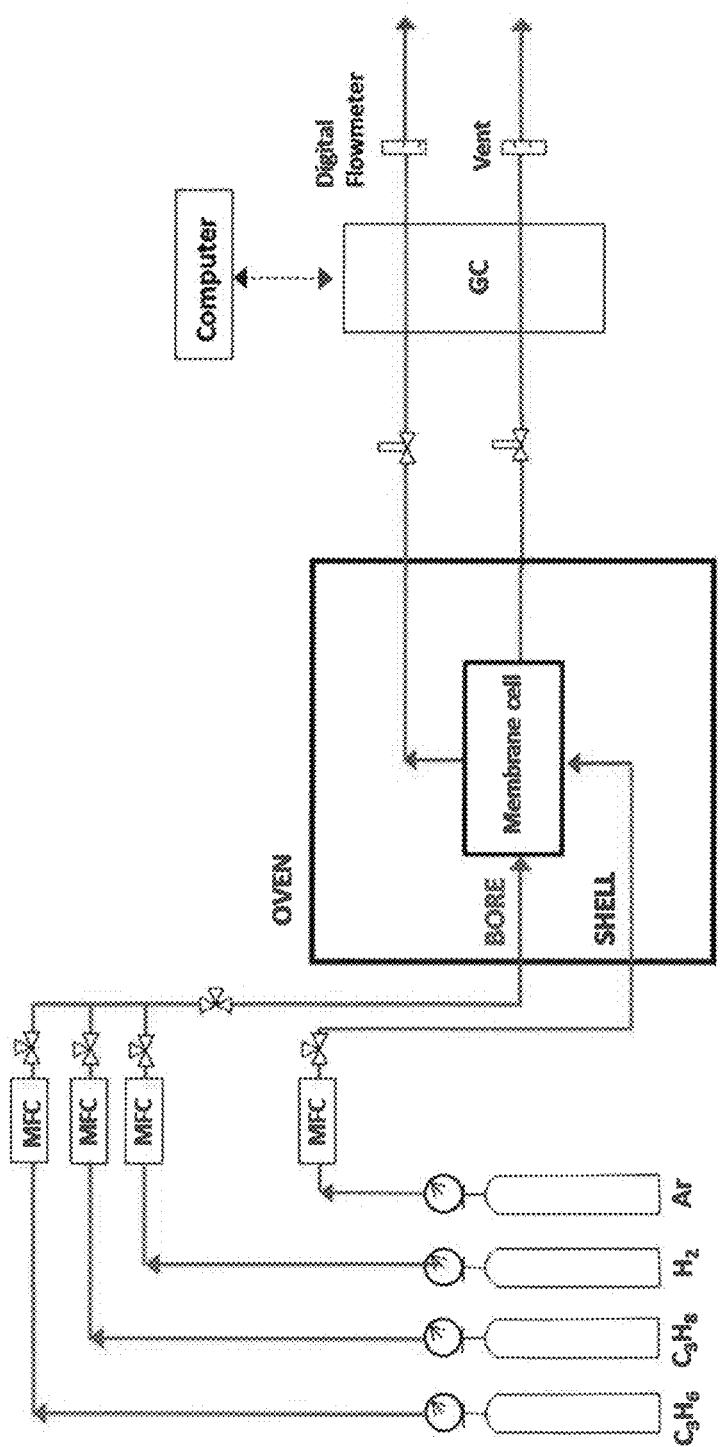
FIG. 16 illustrates a schematic of steady-state gas permeation measurement apparatus, with the reactor cell functioning as the permeation cell.

The separation properties of the ZIF-8 membrane grown on the inner bore of the polyamide-imide (e.g., TORLON®) hollow fiber 100 were characterized by hydrogen ($H_2$)/propane ($C_3H_8$) and propylene ($C_3H_6$)/propane ($C_3H_8$) binary equimolar mixture permeation as a function of temperature, with the reactor module 400 directly acting as a permeation cell. See FIG. 16. In an embodiment, the feed mixture may be selected from the group consisting of hydrogen/hydrocarbons, hydrogen/propane, propylene/propane and butenes/butanes.

A steady-state Wicke Kallenbach technique was used to test binary $H_2/C_3H_8$ and $C_3H_6/C_3H_8$ mixtures. Specifically, 1:1 feed mixtures were flowed through a bore 110 of the ZIF-8 membrane grown on the polyamide-imide (e.g., TORLON®) hollow fiber 100 at about 20 mL/min while an argon sweep gas was flowed across an outer (shell) side surface 105 of the hollow fiber 100 at about 20 mL/min. See e.g., FIGS. 21A-21B, 22A-22B and 23A-23B. In FIGS. 21A-21B, 22A-22B and 23A-23B, the error bars were estimated from characterization of three independent ZIF-8 membrane samples.

A gas chromatograph with TCD and FID detectors was used to determine the composition of permeate. At least 3 GC injections were collected (median permeance values were reported) at each temperature after waiting 30 minutes for steady-state conditions.

The ZIF-8 membranes in polyamide-imide (e.g., TORLON®) hollow fibers 100 were formed using the reaction conditions of Example 1 under intermittent flow conditions (see FIG. 18A: flow profile 2). The as-made ZIF-8 membranes on polyamide-imide (e.g., TORLON®) hollow fibers 100 exhibited clear molecular sieving properties: high $H_2$ permeances, sharp $H_2/C_3H_8$ separation factors as high as 125 at 120° C. (see FIG. 22A), and strong temperature dependence of $H_2$ permeance with temperature, indicating activated molecular transport through the ZIF-8 pores. Further, the example ZIF-8 membrane on polyamide-imide (e.g., TORLON®) hollow fiber 100 proved to be robust showing no decline in permeation properties after six weeks of testing and multiple heating/cooling cycles.

While the permeation properties were dominated by molecular sieving, the $C_3$ isomer (especially $C_3H_8$) permeances were much larger than those expected from previous studies[8,17-20] and prevented a high $C_3H_6/C_3H_8$ separation factor. See FIG. 23B. It was hypothesized that the high $C_3$ isomer permeances were due to both molecular transport through the ZIF-8 membrane as well as due to bypassing of the ZIF-8 membrane by the feed molecules through the ends of the fiber. See FIG. 24A.

Figure 24A:
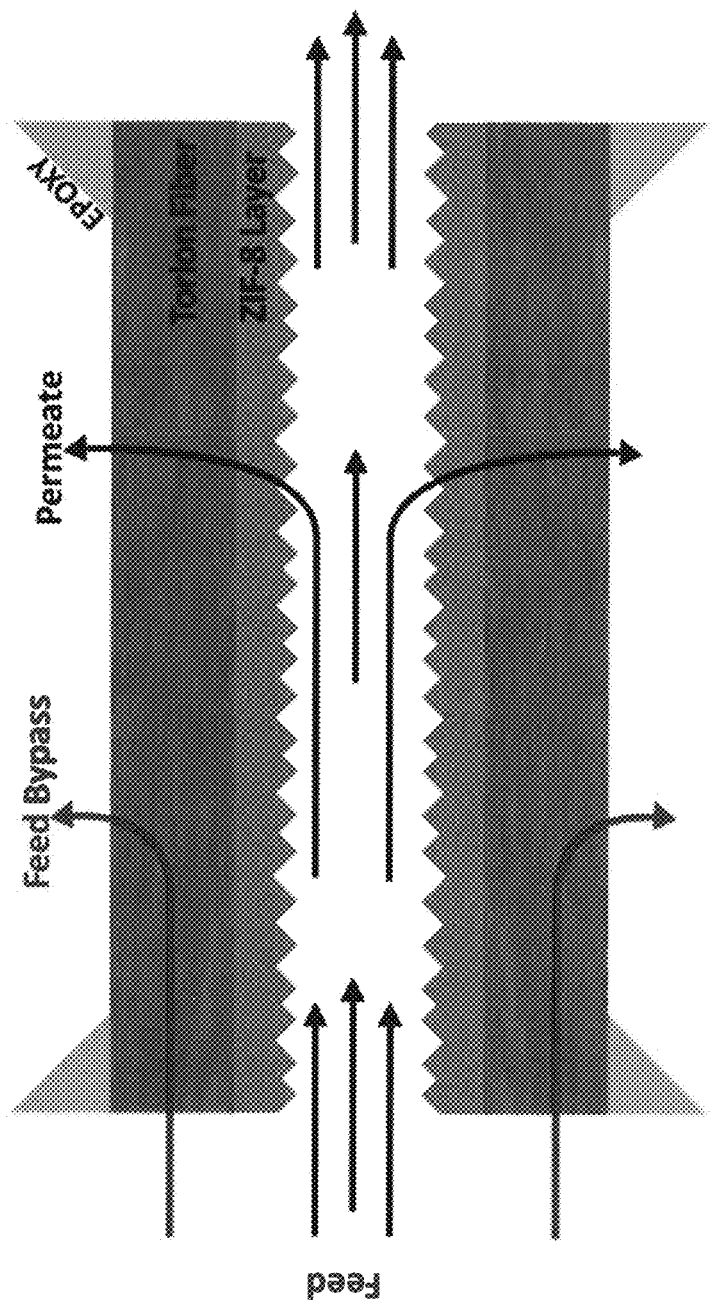
FIG. 24A illustrates a schematic showing feed gas molecules bypassing the ZIF-8 membrane through the hollow fiber ends.
Figure 24B:
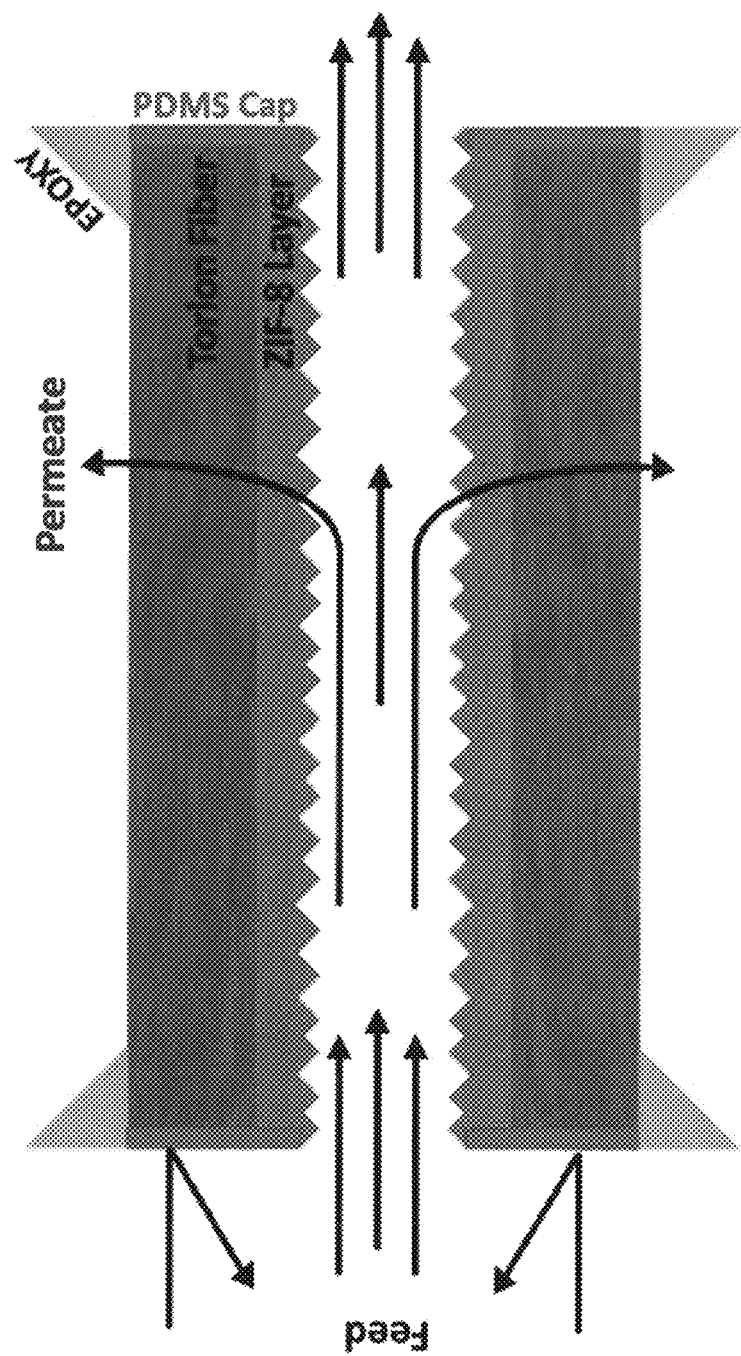
FIG. 24B illustrates a schematic showing suppression of the bypass effect in FIG. 24A by capping the hollow fiber ends with a PDMS film.
Figures 25A, 25B:
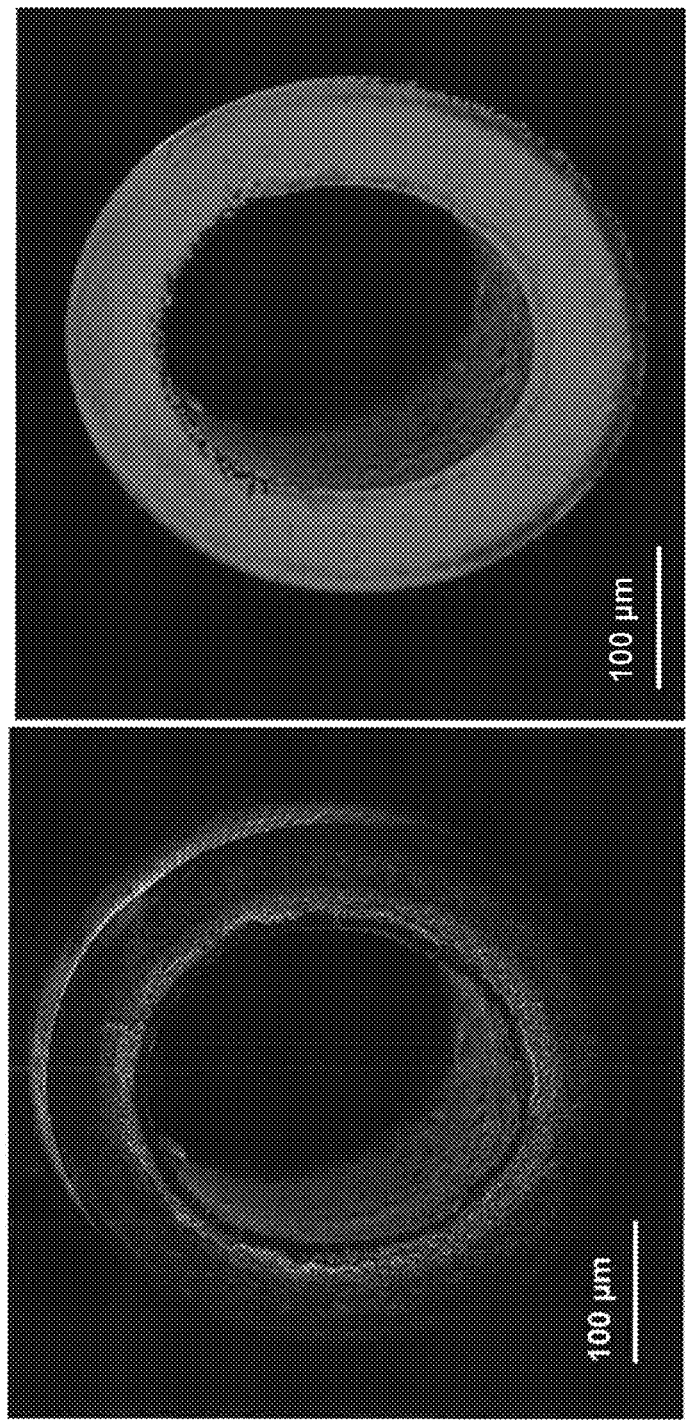
FIG. 25A illustrates a SEM cross-section image of the inner-surface ZIF-8 membrane after end-capping by penetration of PDMS.
FIG. 25B illustrates an EDS elemental map of Si (red) showing the penetration of PDMS into the pores of a polyamide-imide (e.g., TORLON®) hollow fiber.

To suppress this membrane bypass, we include a capping step to the IMMP approach, accomplished by applying a controlled amount of a solution containing poly(dimethylsiloxane) (PDMS) to the ends of the mounted hollow fibers 100. See FIG. 24B. The PDMS solution is readily absorbed by capillary action into the hollow fiber 100, and blocks the pores of the hollow fiber 100 support. See FIGS. 25A and 25B. SEM cross-sectional imaging (see FIG. 25A) and EDX mapping (see FIG. 25B) indicated that the fiber matrix is completely covered by PDMS while the bore remains unblocked. Since the permeances of the feed gases through PDMS are 3 orders of magnitude lower than through the macroporous hollow fiber 100 support, the $C_3H_8$ flux should decrease substantially after capping. After curing the PDMS-sealed hollow fibers 100, the $H_2/C_3H_8$ separation factor is now much higher (370 at 120° C.) (see FIG. 21A) and the $C_3H_6/C_3H_8$ separation factor is also higher (12 at 25° C.) (see FIG. 21B), consistent with previously reported ZIF-8 membranes with low defect densities.[8,17-20] Notably, the $C_3H_8$ permeance decreased by a factor of 10 after capping. This indicates that most of the propane was previously bypassing the ZIF-8 layer and that the addition of the capping step to the IMMP largely shuts down this non-selective permeation path. The permeate stream contains 92% $C_3H_6$/8% $C_3H_8$, which is a significant upgrade from the equimolar feed stream.

Performance of Bundle of ZIF-8 Membranes Made Using IMMP Reactor Cell/Module

In large-scale gas separations with hollow fiber membranes, high membrane areas per unit module volume are achieved by bundling large numbers of fibers in the permeation module. The present invention has the advantage of being inherently a modular approach that should allow independent processing of membranes in each fiber constituting a bundle.

To demonstrate this concept, we applied reactor module 400 to the simultaneous processing of three polyamide-imide (e.g., TORLON®) hollow fiber 100 supports. The processing conditions were identical to the case of the single-fiber membranes, except that the total feed solution initially introduced to the bore and the flow rate on the bore side was increased by a factor of 3 so that the flow rate through individual hollow fibers 100 was maintained constant in relation to the single-fiber membrane fabrication described earlier. The ends of the hollow fibers 100 were capped in a similar manner as described earlier.

Figure 23A:
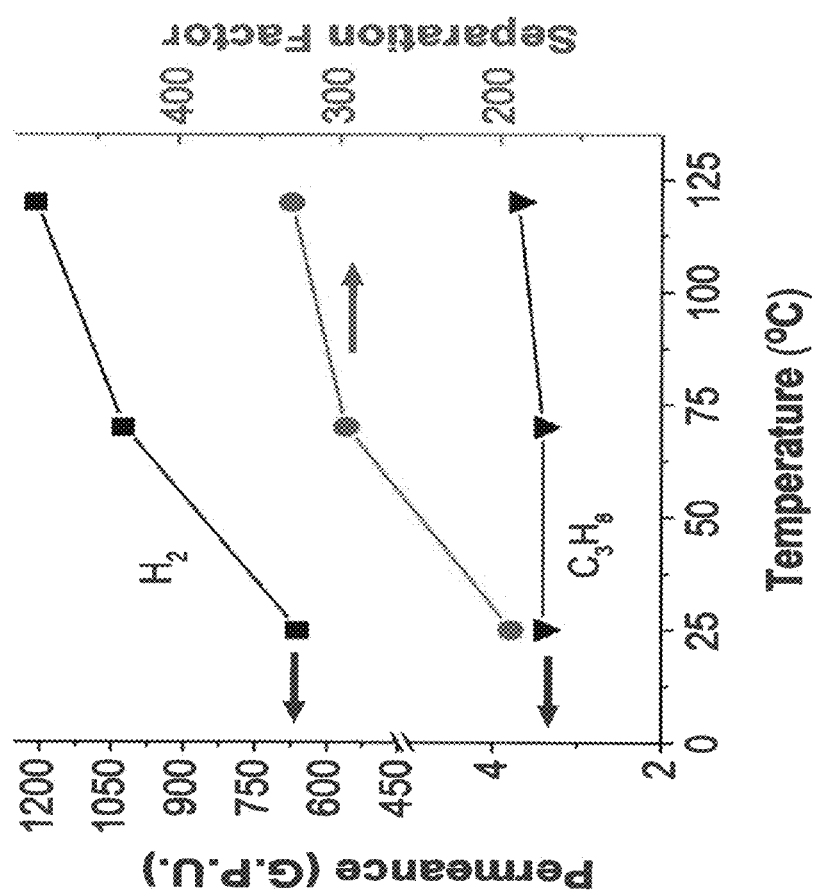
FIG. 23A illustrates a chart of Temperature (° C.) v. Permeance (G.P.U.) and Separation Factor, showing binary permeation characteristics for equimolar $H_2/C_3H_8$ feed mixtures on ZIF-8 membranes grown simultaneously in three (3) polyamide-imide (e.g., TORLON®) hollow fiber using the IMMP system and sealing the ends of the fibers with PDMS.
Figure 23B:
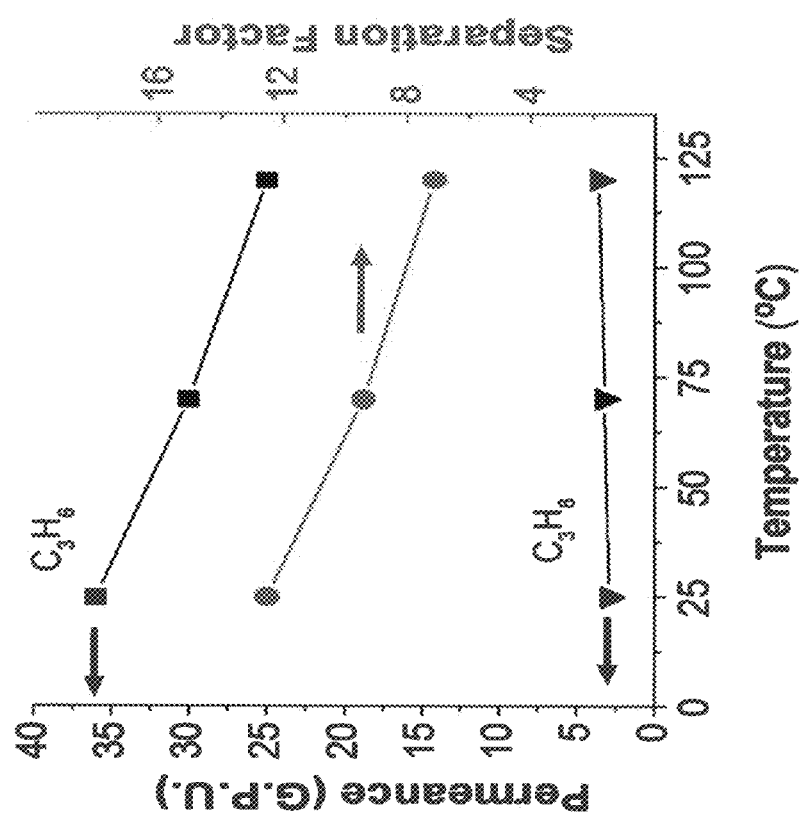
FIG. 23B illustrates a chart of Temperature (° C.) v. Permeance (G.P.U.) and Separation Factor, showing binary permeation characteristics for an equimolar $C_3H_6/C_3H_8$ feed mixture on ZIF-8 membranes grown simultaneously in three (3) polyamide-imide (e.g., TORLON®) hollow fiber using the IMMP approach and sealing the ends of the fibers with PDMS.

FIGS. 23A and 23B show that the $H_2/C_3H_8$ and $C_3H_6/C_3H_8$ separation behavior is near-identical to the single-fiber membranes (see FIGS. 21A and 21B), thereby clearly demonstrating the potential for scalability of the IMMP approach. We also note that the separation factor values of the ZIF-8 membranes are very sensitive to the small permeance of $C_3H_8$ (~2.5 GPU in the present invention). With further improvements in the capping methods (e.g., using less permeable polymers than PDMS) and optimization of the ZIF-8 membrane growth conditions, the small $C_3H_8$ permeance can be further reduced and the separation factor further increased, leading to a highly attractive membrane platform for hydrocarbon separations. Given the overall importance of tunable ZIF materials for a range of hydrocarbon separations, the membrane processing approach reported here overcomes many of the limitations of current processes and moves significantly towards realizing scalable molecular sieving MOF membranes.

The embodiments and examples set forth herein are presented to best explain the present invention and its practical application and to thereby enable those skilled in the art to make and utilize the invention. However, those skilled in the art will recognize that the foregoing description and examples have been presented for the purpose of illustration and example only. The description as set forth is not intended to be exhaustive or to limit the invention to the precise form disclosed. Many modifications and variations are possible in light of the above teaching without departing from the spirit and scope of the following claims.

Definitions

As used herein, the terms "a," "an," "the," and "said" when used in conjunction with the term "comprising" means one or more, unless the context dictates otherwise.

As used herein, the term "about" means the stated value plus or minus a margin of error or plus or minus 10% if no method of measurement is indicated.

As used herein, the term "or" means "and/or" unless explicitly indicated to refer to alternatives only or if the alternatives are mutually exclusive.

As used herein, the terms "comprising," "comprises," and "comprise" are open-ended transition terms used to transition from a subject recited before the term to one or more elements recited after the term, where the element or elements listed after the transition term are not necessarily the only elements that make up the subject.

As used herein, the terms "containing," "contains," and "contain" have the same open-ended meaning as "comprising," "comprises," and "comprise," provided above.

As used herein, the terms "having," "has," and "have" have the same open-ended meaning as "comprising," "comprises," and "comprise," provided above.

As used herein, the terms "including," "includes," and "include" have the same open-ended meaning as "comprising," "comprises," and "comprise," provided above.

As used herein, the phrase "consisting of" is a closed transition term used to transition from a subject recited before the term to one or more material elements recited after the term, where the material element or elements listed after the transition term are the only material elements that make up the subject.

As used herein, the phrase "consisting essentially of" occupies a middle ground, allowing the addition non-material elements that do not substantially change the nature of the invention, such as various buffers, differing salts, extra wash or precipitation steps, pH modifiers, and the like.

As used herein, the phrase "growth solvent" means a liquid in which the MOF seed crystals can be increased in size, either by crystal deposition or synthesis, but without harming the polymer.

As used herein, the phrase "nanocrystals" means the seed crystals have an average size of less than one micron, preferably about 400-600 nm, and a size distribution of +1-10%. For polymers with very small pores, a smaller seed crystal may be needed, and therefore the seed crystal size can be reduced as needed.

As used herein, the phrase "non-solvent" means a liquid in which the MOF precursors have a low solubility, such that on introducing the non-solvent to the mixture, the precursors are unable to stay in solution and condense quickly to form a large number of nuclei, which are the seeds for growing a large number of very small crystals.

As used herein, the phrase "seed solvent" means a liquid in which the MOF nanocrystals can be carried into the pores of the polymer. Thus, the seed crystals should have low solubility in the solvent and the solvent should penetrate or wet the pores of the polymer, but without harming the polymer.

As used herein, the term "simultaneously" means occurring at the same time or about the same time, including concurrently.

As used herein, "starting material" means that the recited chemical is made or purchased for use as an early reactant in the synthetic pathway. However, if made, rather than purchased, there may be other ingredients that pre-date same.

Abbreviations

The following abbreviations are used herein:

| | |
|---|---|
| DI | Deionized water |
| DLS | Dynamic light scattering |
| EDS | Energy dispersive X-ray spectroscopy |
| $H_2$ | Hydrogen |
| IMMP | Interfacial Microfluidic Membrane Processing |
| mIm | 2-methyl imidazole |
| MOF | Metal organic framework |
| PDMS | Poly(dimethylsiloxane) |
| $C_3H_8$ | Propane |
| C3H6 | Propylene |
| SEM | Scanning electron microscope |

| XRD | X-ray diffraction |
| ZIF | Zeolitic imidazolate framework |
| ZIF-8 | Zeolitic imidazolate framework 8 |
| ZIF-90 | Zeolitic imidazolate framework 90 |

INCORPORATION BY REFERENCE

All patents and patent applications, articles, reports, and other documents cited herein are fully incorporated by reference to the extent they are not inconsistent with this invention, as follows:
1) J. Gascon, et al., CHEM. MATER. 24 (2012) 2829-2844 (2012).
2) K. Varoon, et al., SCIENCE 334 (2011) 72-75.
3) M. Shah, et al., IND. ENG. CHEM. RES. 51 (2012) 2179-2199.
4) M. G. Buonomenna, RSC ADVANCES 3 (2013) 5694-5740.
5) M. Tsapatsis, SCIENCE 334 (2011) 767-768.
6) T. Cao, et al., SCIENCE 334 (2011) 1533-1538.
7) J. Choi, et al., SCIENCE 334 (2009) 590-593.
8) Y. Pan, et al., J. MEMBR. SCI. 421 (2012) 292-298.
9) J. A. Thompson, et al., CHEM. MATER. 24 (2012) 1930-1936.
10) K. S. Park, et al., PROC. NATL. ACAD. SCI. U.S.A. 103 (2006) 10186-10191.
11) A. Huang, et al., *J. AM. CHEM. SOC.* 132 (2010) 15562-15564.
12) A. J. Brown, et al., ANGEW. CHEM. INT. ED. 51 (2012) 10615-10618.
13) R. Ameloot, et al., NAT. CHEM. 3 (2011) 382-387.
14) M. Pera-Titus, et al., J. MEMBR. SCI. 278 (2006) 401-409.
15) K. Li, et al., J. AM. CHEM. SOC. 131 (2009) 10368-10369.
16) K. S. Jang, et al., CHEM. MATER. 23 (2011) 3025-3028.
17) Y. Pan, et al., J. MEMBR. SCI. 390 (2012) 93-98.
18) H. Bux, et al., CHEM. MATER. 23 (2011) 2262-2269.
19) Y. Pan, Z. Lai, CHEM. COMM'N. 47 (2011) 10275-10277.
20) H. T. Kwon, H. K. Jeong, CHEM. COMM'N. 49 (2013) 3854-3856.

What is claimed is:

1. A reactor cell device for flow processing molecular sieving membranes, comprising:
   a) a reactor module having a base shape and a first height, wherein the base shape is selected from the group consisting of square, rectangular, circular and ellipse; wherein a reactor chamber extends into the reactor module from an upper surface; wherein a first hole extends into the reactor chamber from a first surface, a second hole opposing the first hole extends into the reactor chamber from a second surface, a third hole extends into the reactor chamber from a third surface and a fourth hole opposing the third hole extends into the reactor chamber from a fourth surface; wherein the first hole is fluidically connected to a first inlet, the second hole is fluidically connected to a first outlet, the third hole is fluidically connected to a second inlet and the fourth hole is fluidically connected to a second outlet;
   b) a reactor module cover having the same base shape as the reactor module and a second height, wherein the reactor module cover is fastened to the reactor module to seal the reactor chamber; and
   c) a hollow fiber having a first end and a second end, wherein a length of the first end is supported by and sealed into the first hole and a length of the second end is supported by and sealed into the second hole; wherein the first and second ends of the hollow fiber are capped with a capping solution.

2. The device of claim 1, wherein the first hole extends into the reactor chamber from the first surface, the second hole opposing the first hole extends into the reactor chamber from the second surface, the third hole extends into the reactor chamber from the first surface and the fourth hole opposing the third hole extends into the reactor chamber from the second surface.

3. The device of claim 1, wherein the first hole extends into the reactor chamber from the first surface, the second hole opposing the first hole extends into the reactor chamber from the second surface, the third hole extends into the reactor chamber from an upper surface of a reactor module cover and the fourth hole opposing the third hole extends into the reactor chamber from a bottom surface of the reactor chamber.

4. The device of claim 1, wherein the reactor module and cover are constructed of a metal or a plastic.

5. The device of claim 1, wherein the reactor module and cover are constructed from a metal selected from the group consisting of stainless steel and stainless steel alloys.

6. The device of claim 4, where the plastic is selected from the group consisting of polyether ketone (PEEK), polymethylene, polytetrafluorethylene (PTFE).

7. The device of claim 1, wherein the reactor module and cover are constructed from stainless steel 304.

8. The device of claim 1, wherein the first and second holes are offset vertically from the third and fourth holes.

9. The device of claim 1, wherein the lengths of the first and second ends of the hollow fiber are sealed into the first and second holes with an adhesive.

10. The device of claim 1, wherein the capping solution is about 8 wt % to about 10 wt % poly(dimethylsiloxane) (PDMS) in heptane.

11. A method of making the reactor cell device of claim 1, comprising the steps of:
   a) fabricating a reactor chamber extending into the reactor module from the upper surface of the reactor module;
   b) fabricating an O-ring groove with an inner dimension slightly larger than and offset from the outer dimension of the reactor chamber;
   c) fabricating the first hole extending into the reactor chamber from the first surface and the second hole opposing the first hole and extending into the reactor chamber from the second surface;
   d) fabricating a third hole extending into the reactor chamber from a third surface and a fourth hole opposing the third hole and extending into the reactor chamber from a fourth surface;
   e) supporting and sealing the length of the first end of the hollow fiber in the first hole and the length of the second end of the hollow fiber into the second hole;
   f) capping the first and second ends of the hollow fiber with a capping solution; and
   g) fabricating the reactor module cover to fit on the upper surface of the reactor module and fastening the reactor module cover to the seal the reactor chamber.

12. The method of claim 11 further comprising the steps of:
   a) fluidically connecting a bore solution to the first inlet;
   b) fluidically connecting a shell solution to the second inlet; and
   c) growing a molecular sieving membrane on the inner bore surface of the hollow fiber.

13. The method of claim 12, wherein the bore solution contains a limited Zn+2 concentration ranging from about 0.005 to about 0.1 mol/L Zn+2 in 1-octanol.

14. The method of claim 12, wherein the bore solution contains a limited Zn+2 concentration ranging from about 0.01 to about 0.03 mol/L Zn+2 in 1-octanol.

15. The method of claim 12, wherein the bore solution is about 0.018 mol/L Zn+2 in 1-octanol.

16. The method of claim 12, wherein the shell solution contains an excess mIm ligand concentration ranging from about 0.5 to about 10 mol/L 2-methyl imidazole (mIm) in deionized water.

17. The method of claim 12, wherein the shell solution contains an excess mIm ligand concentration ranging from about 1.2 to about 1.6 mol/L 2-methyl imidazole (mIm) in deionized water.

18. The method of claim 12, wherein the shell solution is about 1.37 mol/L mIm in deionized water.

19. The method of claim 12, further comprising the step of gently stirring the shell solution to prevent formation of local concentration gradients.

20. The method of claim 19, wherein the shell solution is stirred at about 40 rpm to about 80 rpm.

21. The method of claim 12, further comprising the steps of
   a) flowing the bore solution at a first flow rate for a first period;
   b) stopping the first flow rate of the bore solution for a second period;
   c) flowing the bore solution at a second flow rate for a third period; and
   d) stopping the second flow rate of the bore solution for a fourth period.

22. The method of claim 21, wherein the first and second flow rates are about 1 µL/hour to about 10004/hour per individual hollow fiber.

23. The method of claim 21, wherein the first and second flow rates are about 10 µL/hour to about 100 µL/hour per individual hollow fiber.

24. The method of claim 21, wherein the first period is about 1 hour to about 3 hours, the second period is about 3 hours to about 4 hours, the third period is about 10 minutes to about 30 minutes, and the fourth period is about 3 hours to about 4 hours.

25. The method of claim 12, further comprising the step of rinsing the membrane in solvents selected from the group consisting of 1-octanol, heptanes, hexane, methanol and deionized water.

26. A method of using a reactor cell device for flow processing molecular sieving membranes, comprising the steps of:
   a) providing a device comprising a reactor module having a base shape and a first height, wherein the base shape is selected from the group consisting of square, rectangular, circular and ellipse; wherein a reactor chamber extends into the reactor module from an upper surface; wherein a first hole extends into the reactor chamber from a first surface, a second hole opposing the first hole extends into the reactor chamber from a second surface, a third hole extends into the reactor chamber from a third surface and a fourth hole opposing the third hole extends into the reactor chamber from a fourth surface; wherein the first hole is fluidically connected to a first inlet, the second hole is fluidically connected to a first outlet, the third hole is fluidically connected to a second inlet and the fourth hole is fluidically connected to a second outlet; a reactor module cover having the same base shape as the reactor module and a second height, wherein the reactor module cover is fastened to the reactor module to seal the reactor chamber; and a hollow fiber having a first end and a second end, wherein a length of the first, end is supported by and sealed into the first hole and a length of the second end is supported by and sealed into the second hole; wherein the first and second ends of the hollow fiber are capped with a capping solution;
   b) fluidically connecting a feed mixture to the first inlet;
   c) fluidically connecting a sweep gas to the second inlet;
   d) collecting a separated mixture from the first outlet; and
   e) collecting permeate from the second outlet.

27. The method of claim 26, wherein the feed mixture is selected from the group consisting of hydrogen/hydrocarbons, hydrogen/propane, propylene/propane and butenes/butanes.

28. The method of claim 27, wherein the feed mixture is selected from the group consisting of hydrogen/propane, propylene/propane and butenes/butanes.

* * * * *